United States Patent
Nishimoto et al.

(10) Patent No.: US 8,824,446 B2
(45) Date of Patent: Sep. 2, 2014

(54) WIRELESS COMMUNICATION SYSTEM, TRANSMISSION DEVICE, AND RECEIVING DEVICE

(75) Inventors: Hiroshi Nishimoto, Tokyo (JP); Tomoya Yamaoka, Tokyo (JP); Hiroshi Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 251 days.

(21) Appl. No.: 13/254,677

(22) PCT Filed: Mar. 2, 2010

(86) PCT No.: PCT/JP2010/053357
§ 371 (c)(1), (2), (4) Date: Sep. 2, 2011

(87) PCT Pub. No.: WO2010/101156
PCT Pub. Date: Sep. 10, 2010

(65) Prior Publication Data
US 2012/0002661 A1 Jan. 5, 2012

(30) Foreign Application Priority Data
Mar. 5, 2009 (JP) ................................. 2009-052551

(51) Int. Cl.
*H04J 3/00* (2006.01)
*H04B 7/02* (2006.01)
*H04W 4/00* (2009.01)

(52) U.S. Cl.
USPC ............................ 370/345; 370/334; 375/267

(58) Field of Classification Search
CPC ............................ H04B 7/0413; H04B 7/0671
USPC .......................... 370/508, 517, 519, 345, 334
See application file for complete search history.

(56) References Cited

U.S. PATENT DOCUMENTS

| | | | | |
|---|---|---|---|---|
| 6,658,269 | B1 * | 12/2003 | Golemon et al. | 370/315 |
| 2003/0043776 | A1 * | 3/2003 | Lomp et al. | 370/342 |

(Continued)

FOREIGN PATENT DOCUMENTS

| | | |
|---|---|---|
| CN | 1720674 A | 1/2006 |
| CN | 101159464 A | 4/2008 |

(Continued)

OTHER PUBLICATIONS

International Search Report issued Apr. 27, 2010 in PCT/JP10/53357 filed Mar. 2, 2010.

(Continued)

*Primary Examiner* — Ayaz Sheikh
*Assistant Examiner* — Mariela Vidal Carpio
(74) *Attorney, Agent, or Firm* — Oblon, Spivak, McClelland, Maier & Neustadt, L.L.P.

(57) ABSTRACT

A wireless communication system includes a transmission device including plural transmission antennas and a receiving device including plural reception antennas. The transmission device includes a branching unit that branches a signal into plural transmission signals respectively passing plural signal lines each corresponding to each of the transmission antennas and delay units provided on at least one of the signal lines to apply a delay to the transmission signal. When a transmission signal branched by the branching unit is applied with a delay by the delay units, the transmission device sets the transmission signal on which the delay is applied as the transmission signal, and transmits the transmission signals to the receiving device via the transmission antennas. The receiving device includes delay units provided on at least one of plural signal lines that respectively pass plural reception signals received at the reception antennas to apply a delay to the reception signal and a combining unit that sets the reception signal on which the delay is applied as the reception signal, and combines the reception signals.

16 Claims, 15 Drawing Sheets

(56) References Cited

U.S. PATENT DOCUMENTS

| | | |
|---|---|---|
| 2006/0057969 A1 | 3/2006 | Van Houtum |
| 2006/0148429 A1* | 7/2006 | Inogai et al. ............... 455/115.1 |
| 2007/0111759 A1* | 5/2007 | Tanaka ..................... 455/562.1 |
| 2007/0281746 A1* | 12/2007 | Takano et al. ............. 455/562.1 |
| 2008/0187009 A1* | 8/2008 | Kim et al. .................... 370/517 |
| 2008/0233878 A1* | 9/2008 | Iizuka et al. .................... 455/42 |
| 2008/0285677 A1* | 11/2008 | Lee et al. ..................... 375/295 |
| 2009/0135940 A1* | 5/2009 | Imamura ..................... 375/267 |
| 2009/0149146 A1* | 6/2009 | Emrick et al. .............. 455/277.2 |
| 2010/0260287 A1 | 10/2010 | Imamura |

FOREIGN PATENT DOCUMENTS

| | | |
|---|---|---|
| JP | 62 120130 | 6/1987 |
| JP | 4 40713 | 2/1992 |
| JP | 2 572 765 | 1/1997 |
| JP | 2001 333005 | 11/2001 |
| JP | 2006 509394 | 3/2006 |
| JP | 2008 92433 | 4/2008 |
| JP | 2008 278076 | 11/2008 |
| WO | 2007 026882 | 3/2007 |
| WO | 2007 26882 | 3/2007 |
| WO | WO 2007/026882 * 3/2007 ............... H04B 7/26 |

OTHER PUBLICATIONS

Office Action issued Aug. 5, 2013 in Chinese Application No. 201080010345.5 (With English Translation).

* cited by examiner

WIRELESS COMMUNICATION SYSTEM, TRANSMISSION DEVICE, AND RECEIVING DEVICE

FIELD

The present invention relates to a wireless communication system that uses a plurality of antennas for transmitting and receiving a signal.

BACKGROUND

Conventionally, a spatial diversity technique for reducing degradation of transmission characteristics due to fading in wireless communications has been known. A transmission device includes two antennas, where a modulated wave is transmitted from one antenna and a modulated wave delayed by one time slot or more is transmitted from the other antenna. A receiving device performs multipath processing of emphasizing and extracting a principal wave component included in a reception wave. With this configuration, it is possible to obtain a diversity effect by spatial and frequency diversity without broadening bandwidths. Such a technique is disclosed in Patent Literature 1 mentioned below.

CITATION LIST

Patent Literature

Patent Literature 1: Japanese Patent No. 2572765

SUMMARY

Technical Problem

However, the conventional technique described above is limited to a transmission diversity in which two transmission antennas and one reception antenna are used. Therefore, there is a problem that it cannot be applied to a case where a plurality of antennas are used for transmitting and receiving a signal.

The present invention has been achieved in view of the above problems, and an object of the present invention is to obtain a wireless communication system that can apply an appropriate delay amount when using a plurality of antennas for transmitting and receiving a signal.

Solution to Problem

In order to solve the above problem and in order to attain the above object, a wireless communication system of the present invention includes: a transmission device having a plurality of transmission antennas; and a receiving device having a plurality of reception antennas. Additionally, the transmission device includes a branching unit that branches a signal into a plurality of transmission signals respectively passing through a plurality of signal lines each corresponding to each of the transmission antennas, and a transmission delay unit that is provided on at least one of the signal lines and applies a delay to a transmission signal. when a transmission signal branched by the branching unit is applied with a delay by the transmission delay unit, the transmission device takes the transmission signal on which the delay is applied as the transmission signal, and transmits the transmission signals to the receiving device via the transmission antennas, respectively. More additionally, the receiving device includes a reception delay unit that is provided on at least one of a plurality of signal lines respectively passing a plurality of reception signals received at the reception antennas and applies a delay to a reception signal, and a combining unit that takes, when the reception signal is applied with a delay by the reception delay unit, the reception signal on which the delay is applied as the reception signal, and combines the reception signals.

Advantageous Effects of Invention

According to the present invention, when a plurality of antennas are used for transmitting and receiving a signal, it is possible to obtain a diversity effect.

DESCRIPTION OF EMBODIMENTS

Exemplary embodiments of a wireless communication system according to the present invention will be explained below in detail with reference to the accompanying drawings. The present invention is not limited to the embodiments.

First Embodiment

In the present embodiment, there is explained a wireless communication system in which the number of transmission antennas of a transmission device is set to M, the number of spatial multiplexing is set to one, the number of reception antennas of a receiving device is set to N, and the number of spatial multiplexing is set to one, by which a multipath transmission measure is taken in a modulating unit and a demodulating unit.

Figure 1:
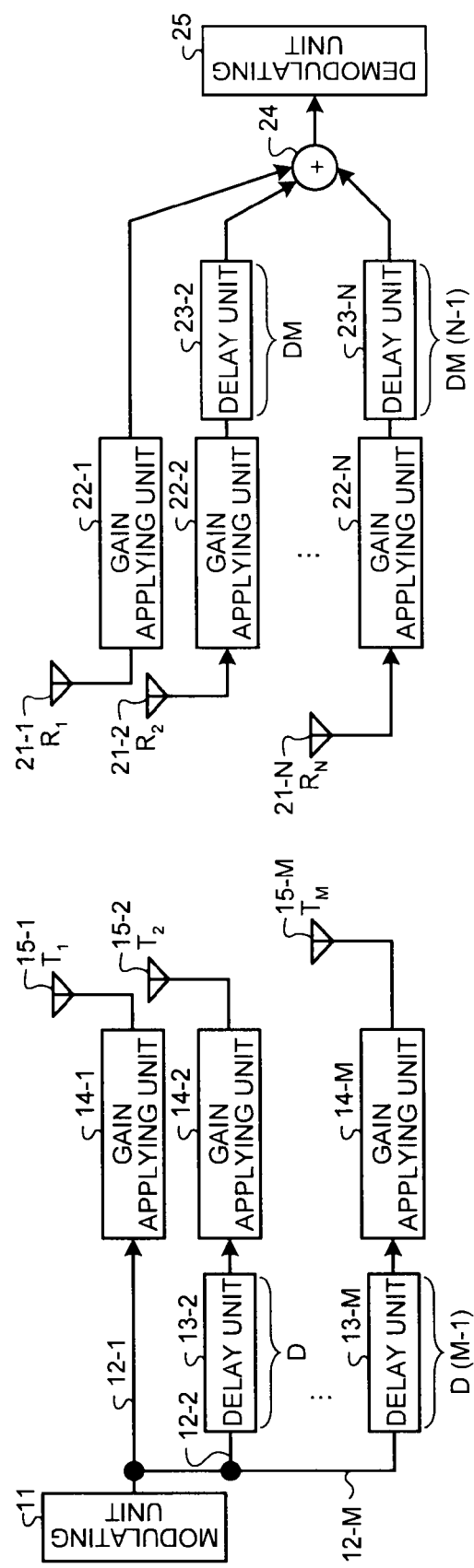
FIG. 1 is a configuration example of a wireless communication system.

FIG. 1 is a configuration example of a wireless communication system according to the present embodiment. The wireless communication system according to the present embodiment is constituted by a transmission device including M transmission antennas and a receiving device including N reception antennas. Each of the devices is explained below in detail.

Figure 2:
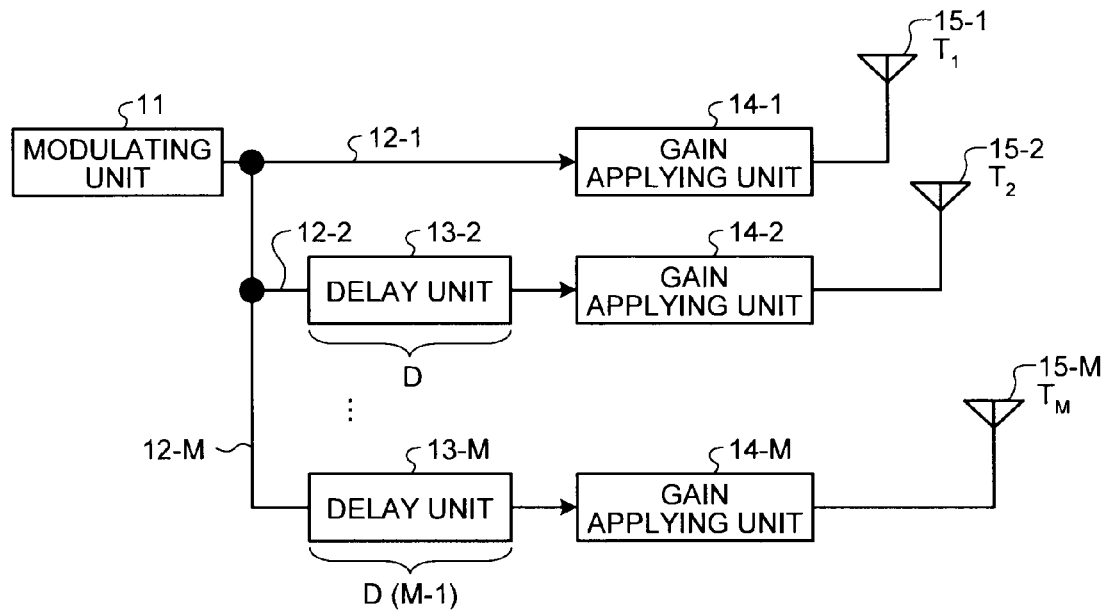
FIG. 2 is a configuration example of a transmission device.

FIG. 2 is a configuration example of the transmission device. The transmission device includes a modulating unit 11, signal lines 12-1 to 12-M, delay units 13-2 to 13-M, gain applying units 14-1 to 14-M, and transmission antennas 15-1 to 15-M. The modulating unit 11 generates a transmission signal. The signal lines 12-1 to 12-M are signal lines for signals that are branched by a branching unit (not shown) by the same number as the number of transmission antennas. Each of the delay units 13-2 to 13-M performs a delay process on a transmission signal. Each of the gain applying units 14-1 to 14-M applies a complex gain to the transmission signal. Each of the transmission antennas 15-1 to 15-M transmits the transmission signal to the receiving device.

Figure 3:
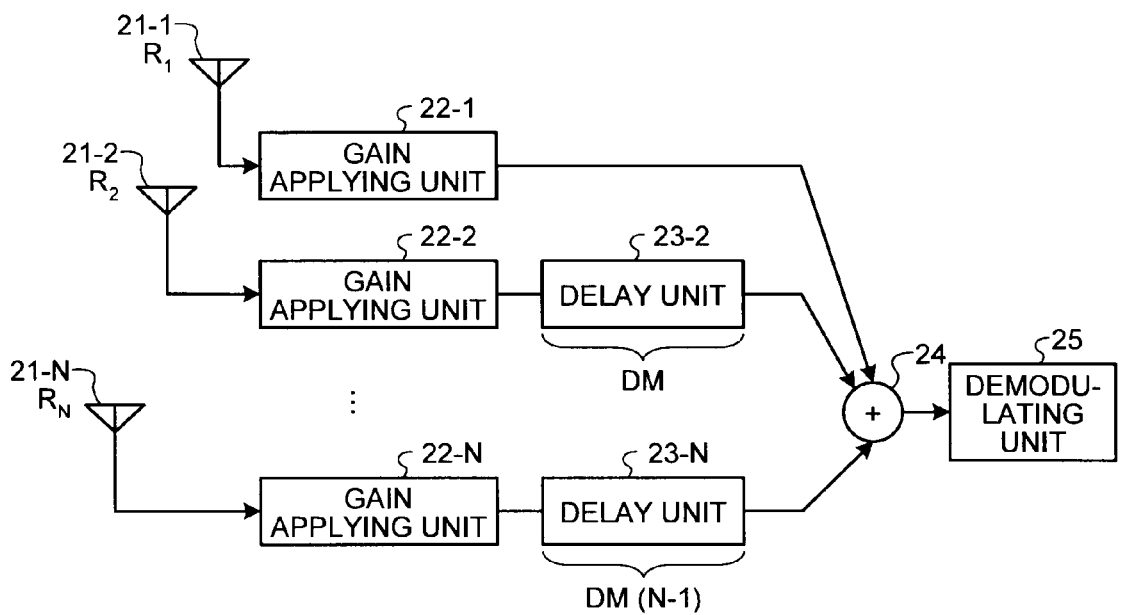
FIG. 3 is a configuration example of a receiving device.

FIG. 3 is a configuration example of the receiving device. The receiving device includes reception antennas 21-1 to 21-N, gain applying units 22-1 to 22-N, delay units 23-2 to 23-N, a combining unit 24, and a demodulating unit 25. Each of the reception antennas 21-1 to 21-N receives a reception signal from the transmission device. Each of the gain applying units 22-1 to 22-N applies a complex gain to the reception signal. Each of the delay units 23-2 to 23-N performs a delay process on the reception signal. The combining unit 24 combines the reception signals after the delay process. The demodulating unit 25 performs a demodulation of a combined reception signal obtained by combining the reception signals.

In the transmission device, the modulating unit 11 generates a transmission signal, and the generated transmission signal is branched into M series of the signal lines 12-1 to 12-M. Among these signals, the transmission signals transmitted through the signal lines 12-2 to 12-M are input to the delay units 13-2 to 13-M, respectively. As an example of an appropriate delay amount for achieving a diversity effect, the delay unit 13-$i$ ($2 \leq i \leq M$) applies D($i$−1) by using a constant time D as a reference time. As a method of setting a delay amount for each of the transmission antennas, for example, a method can be used in which the constant time D is obtained by D=1/((MN−1)$\Delta$f), where $\Delta$f is a bandwidth of the signal; however, the method of setting the delay amount is not limited thereto.

The transmission signal from the signal line 12-1 and the delayed transmission signals from the delay units 13-2 to 13-M are input to the gain applying units 14-1 to 14-M, respectively, and the transmission signal is multiplied by a complex gain in each of the gain applying units 14-1 to 14-M. The complex gain $A_i$ to be multiplied by the transmission signal of the transmission antenna 15-$i$ ($1 \leq i \leq M$) is represented by the following Equation (1) by using real gain $G_i$ ($0 < G_i$) and phase $\theta_i$ ($0 \leq \theta_i < 2\pi$). In the gain applying unit 14-$i$ ($1 \leq i \leq M$), only the phase of the signal can be changed by $\theta_i$ with the real gain set to $G_i$=1, only the amplitude of the signal can be multiplied by $G_i$ with $\theta_i$=0, or both the amplitude can be multiplied by $G_i$ and the phase can be changed by $\theta_i$. However, the process of applying the gain here is arbitrary, so that it can be skipped if it is not necessary for obtaining the diversity effect. In addition, positions of the delay units 13-2 to 13-M and the gain applying units 14-2 to 14-M can be changed with each other. The transmission antennas 15-1 to 15-M respectively transmit the transmission signals to which the gain is applied by the gain applying units 14-1 to 14-M to the receiving device.

[Equation 1]

$$A_i = G_i \exp(j\theta_i) \quad (1)$$

In the receiving device, reception signals received by the reception antennas 21-1 to 21-N are input to the gain applying units 22-1 to 22-N, respectively. Although a complex gain is applied in each of the gain applying units 22-1 to 22-N, the process of applying the gain here is arbitrary, so that it can be skipped if it is not necessary for obtaining the diversity effect. The reception signals from the gain applying units 22-2 to 22-N are input to the delay units 23-2 to 23-N, respectively, and as an example of an appropriate delay amount for achieving the diversity effect, the delay unit 23-$j$ ($2 \leq j \leq N$) applies DM($j$−1) by using a total delay amount DM of the transmission signal; however, the method of setting the delay amount for each of the reception antennas is not limited thereto. In addition, positions of the gain applying units 22-2 to 22-N and the delay units 23-2 to 23-N can be changed with each other. The combining unit 24 combines the reception signal from the gain applying unit 22-1 and the delayed reception signals from the delay units 23-2 to 23-N. Thereafter, the demodulating unit 25 performs a demodulating process of the combined reception signal. applying units 22-2 to 22-N and the delay units 23-2 to 23-N can be changed with each other. The combining unit 24 combines the reception signal from the signal line 22-1 and the delayed reception signals from the delay units 23-2 to 23-N. Thereafter, the demodulating unit 25 performs a demodulating process of the combined reception signal.

Figure 4:
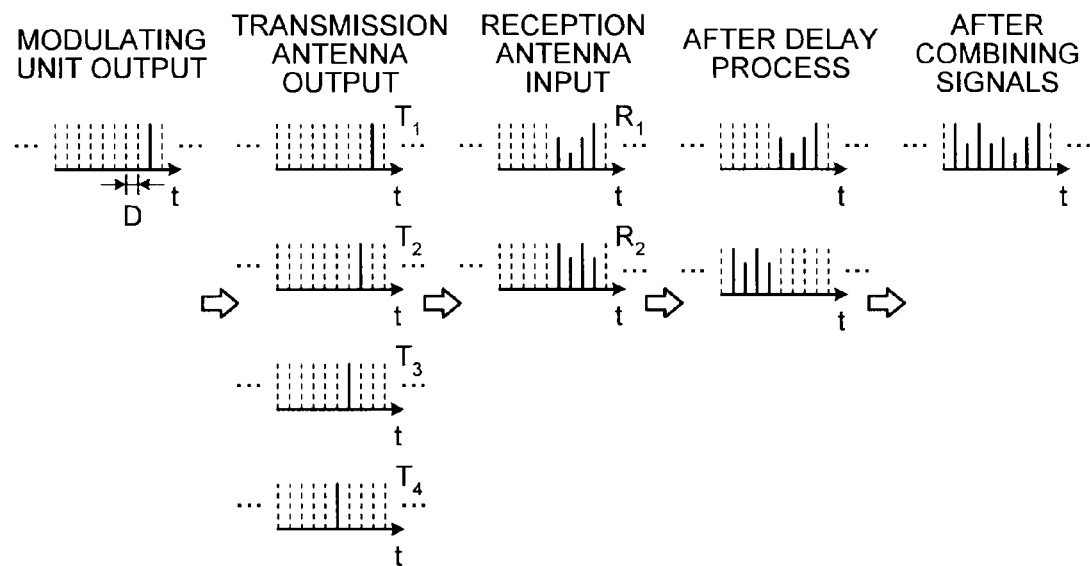
FIG. 4 is an explanatory diagram of stream combining.

Specifically, there is explained an example of combining streams in which the number of the transmission antennas is set to four, the number of reception antennas is set to two, with no delay wave and no time lag in the arrival time in each of the transmission lines. FIG. 4 is an explanatory diagram of stream combining. An interval represented by a dotted line indicates a sampling interval by the delay amount D, and a solid line indicates the main signal.

The transmission device outputs a signal output from the modulating unit 11 and signals that are respectively delayed by delay amounts of D, 2D, and 3D by the delay units 13-2 to 13-4 from the four transmission antennas 15-1 to 15-4, respectively. The receiving device receives the four signals at each of the two reception antennas 21-1 and 21-2, and delays signals received at one reception antenna 21-2 by 4D at the delay unit 23-2. Thereafter, the receiving device combines at the combining unit 24 the signals of the reception antenna 21-2 on which the delay amount is performed and the signals of the other reception antenna 21-1 on which no delay process is performed. By applying such a delay amount, timings of the main signals indicated by the solid line are not overlapped with each other in an output of the combining unit 24.

As explained above, in the present embodiment, the transmission device applies delays independent of each other to the signals to be transmitted from a plurality of transmission antennas such that the timings of the main signals are not overlapped with each other at the reception antenna. Further, the receiving device applies delay amounts independent of each other to the signals received at a plurality of reception antennas such that the timings of the main signals are not overlapped with each other at the time of combining the signals. With this configuration, as a wireless communication system, it is possible to obtain a path diversity effect using a path gain of a transmission line in an effective manner and to obtain a spatial diversity effect using a plurality of transmission and reception antennas.

Further, because an effective receiving process is performed for a multipath transmission in the demodulating unit of the receiving device, it is possible to perform a demodulation with the diversity effect even with a direct input of the combined signal.

In the present embodiment, although the signal processed at each of the delay units 13-2 to 13-M and 23-2 to 23-N is not limited to an analog signal or a digital signal, even with the analog signal, it is possible to perform the delay process with an amount corresponding to the delay amount described in the present embodiment.

In the embodiment described above, the delay times of the signals transmitted from the antennas differ from each other because the transmission delay time is set to D, . . . , and D(M−1); however, for example, the transmission delay times can be the same, like the transmission delay times applied at the delay units 13-2 and 13-3 are D. Although the output of the transmission antenna is different at T2 and T3 in FIG. 4, for example, if the arrival time in a transmission line from the transmission antenna 15-3 to the reception antennas 21-1 and 21-2 is delayed by a sampling interval with respect to the arrival time in a transmission line from the transmission antenna 15-2 to the reception antennas 21-1 and 21-2, there is an effect that the timings of the main signals become the same as those of the reception antenna inputs shown in FIG. 4 at the reception antennas 21-1 and 21-2.

Furthermore, in the embodiment described above, the reception delay times are different from each other at the receiving device because the reception delay times are set to DM, . . . , and DM(N−1); however, for example, the reception delay times can be the same, like the transmission delay times applied at the delay units 23-2 and 23-3 are DM. If the arrival time in a transmission line from the transmission antennas 15-1 to 15-M to the reception antenna 21-3 is delayed by DM with respect to the arrival time in a transmission line from the transmission antennas 15-1 to 15-M to the reception antenna 21-2, there is an effect that the timing of the input to the combining unit 24 becomes the same as the timings of the main signals described in the present embodiment.

Figure 5:
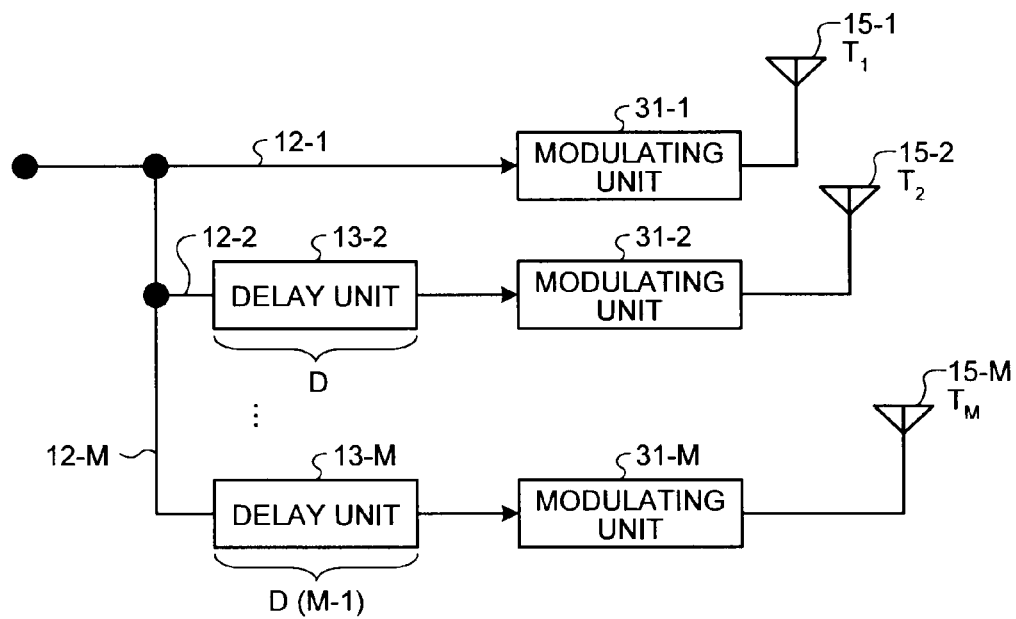
FIG. 5 is a configuration example of the transmission device.

In the present embodiment, the configuration of the transmission device can be modified as follows. FIG. 5 is a configuration example of the transmission device. The transmission device includes the signal lines 12-1 to 12-M, the delay units 13-2 to 13-M, modulating units 31-1 to 31-M, and the transmission antennas 15-1 to 15-M. The modulating units 31-1 to 31-M modulate input data from the signal line 12-1 and delayed input data from the delay units 13-2 to 13-M, respectively. For example, it is effective when an output of the modulating unit is an analog signal so that the delay process is difficult because of hardware limitation.

In addition, it is also possible to obtain a wireless communication apparatus that includes the transmission device and the receiving device explained in the present embodiment as a single unit.

Second Embodiment

In the present embodiment, a delay amount different from that in the first embodiment is applied in a transmission device and a receiving device. The present embodiment explains features different from those of the first embodiment.

Figure 6:
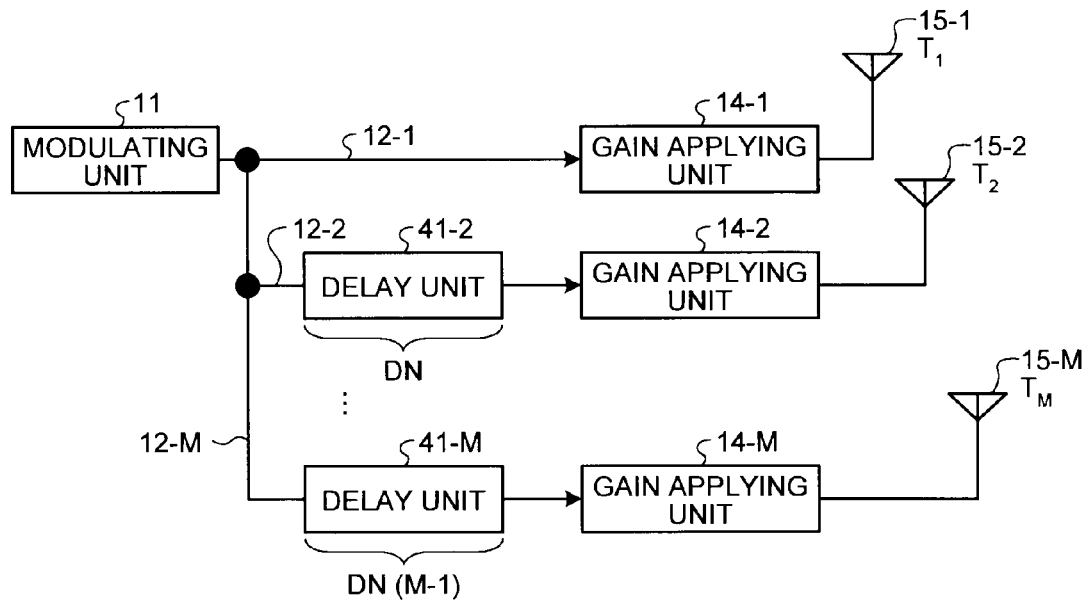
FIG. 6 is a configuration example of a transmission device.

FIG. 6 is a configuration example of the transmission device. The transmission device includes the modulating unit 11, the signal lines 12-1 to 12-M, delay units 41-2 to 41-M, the gain applying units 14-1 to 14-M, and the transmission antennas 15-1 to 15-M. Each of the delay units 41-2 to 41-M performs a delay process on a transmission signal.

Figure 7:
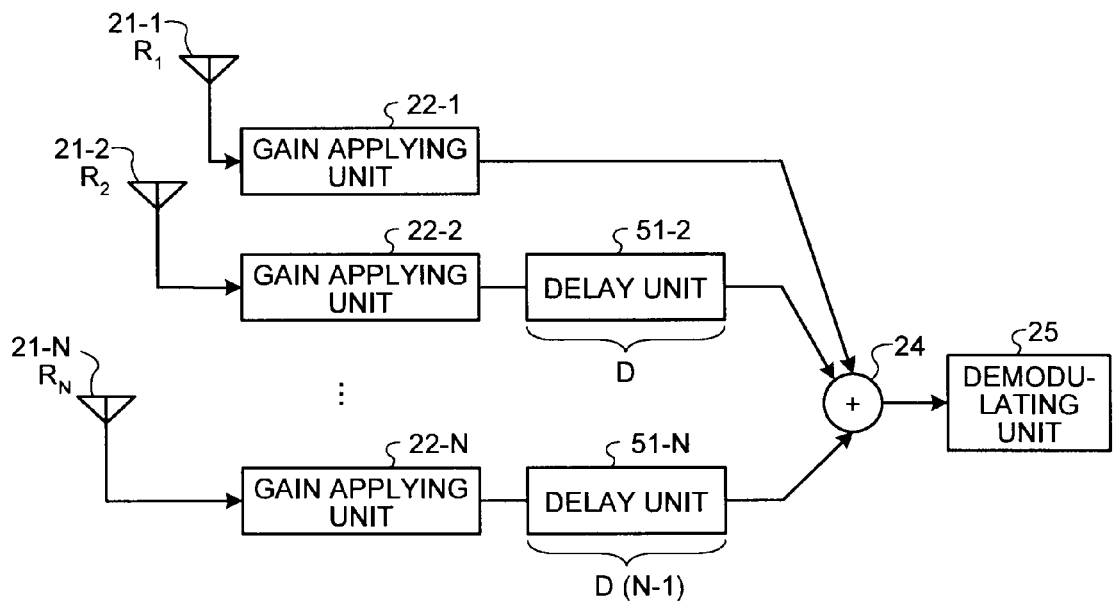
FIG. 7 is a configuration example of a receiving device.

FIG. 7 is a configuration example of the receiving device. The receiving device includes the reception antennas 21-1 to 21-N, the gain applying units 22-1 to 22-N, delay units 51-2 to 51-N, the combining unit 24, and the demodulating unit 25. Each of the delay units 51-2 to 51-N performs a delay process on a reception signal.

In the transmission device, transmission signals are input to the delay units 41-2 to 41-M via the signal lines 12-2 to 12-M, respectively. As an example of an appropriate delay amount for achieving the diversity effect, the delay unit 41-$i$ ($2 \leq i \leq M$) applies DM($i$−1) by using the constant time D. The transmission signal from the signal line 12-1 and the delayed transmission signals from the delay units 41-2 to 41-M are input to the gain applying units 14-1 to 14-M, respectively, and each of the gain applying units 14-1 to 14-M applies a complex gain to each of the transmission signals.

In the receiving device, reception signals from the gain applying units 22-2 to 22-N are input to the delay units 51-2 to 51-N, and as an example of an appropriate delay amount for achieving the diversity effect, the delay unit 51-$j$ ($2 \leq j \leq N$) applies D($j$−1) by using the constant time D.

Figure 8:
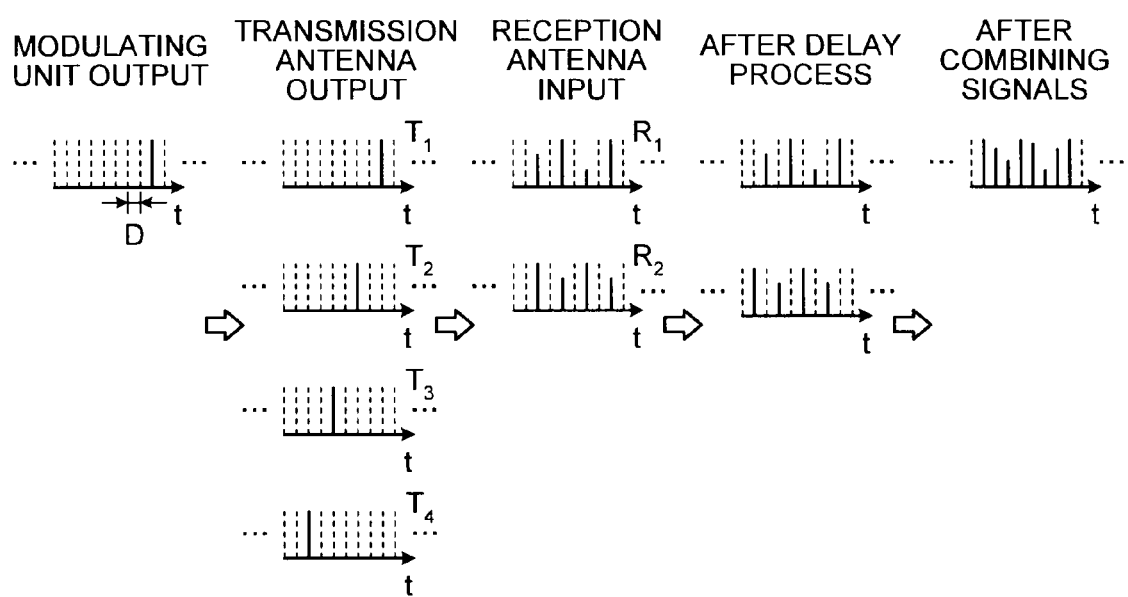
FIG. 8 is an explanatory diagram of stream combining.

Specifically, there is explained an example of combining streams in which the number of the transmission antennas is set to four, the number of reception antennas is set to two, with no delay wave and no time lag in the arrival time in each of the transmission lines. FIG. 8 is an explanatory diagram of stream combining.

The transmission device outputs a signal output from the modulating unit 11 and signals that are respectively delayed by delay amounts of 2D, 4D, and 6D by the delay units 41-2 to 41-4 from the four transmission antennas 15-1 to 15-4, respectively. The receiving device receives the four signals at each of the two reception antennas 21-1 and 21-2, and delays signals received at one reception antenna 21-2 by D at the delay unit 51-2. Thereafter, the receiving device combines at the combining unit 24 the signals of the reception antenna 21-2 on which the delay amount is performed and the signals of the other reception antenna 21-1 on which no delay process is performed. By applying such a delay amount, timings of the main signals indicated by the solid line are not overlapped with each other in an output of the combining unit 24.

In the present embodiment, although the signal processed at each of the delay units 41-2 to 41-M and 51-2 to 51-N is not limited to an analog signal or a digital signal, even with the analog signal, it is possible to perform the delay process with an amount corresponding to the delay amount described in the present embodiment.

As explained above, in the present embodiment, a delay amount considering the number of the reception antennas of the receiving device is applied in the transmission device. With this method, effects identical to those of the first embodiment can be obtained.

Third Embodiment

In the present embodiment, there is explained a wireless communication system in which the number of transmission antennas of a transmission device is set to LK, the number of outputs of a modulating unit is set to L, the number of reception antennas of a receiving device is set to PQ, the number of inputs of a demodulating unit is set to P, MIMO (Multiple Input Multiple Output) space division multiplexing transmission is performed in the modulating unit and the demodulating unit, and a demodulating process is performed in a frequency domain in the receiving device. The present embodiment explains features different from those of the first embodiment.

Figure 9:
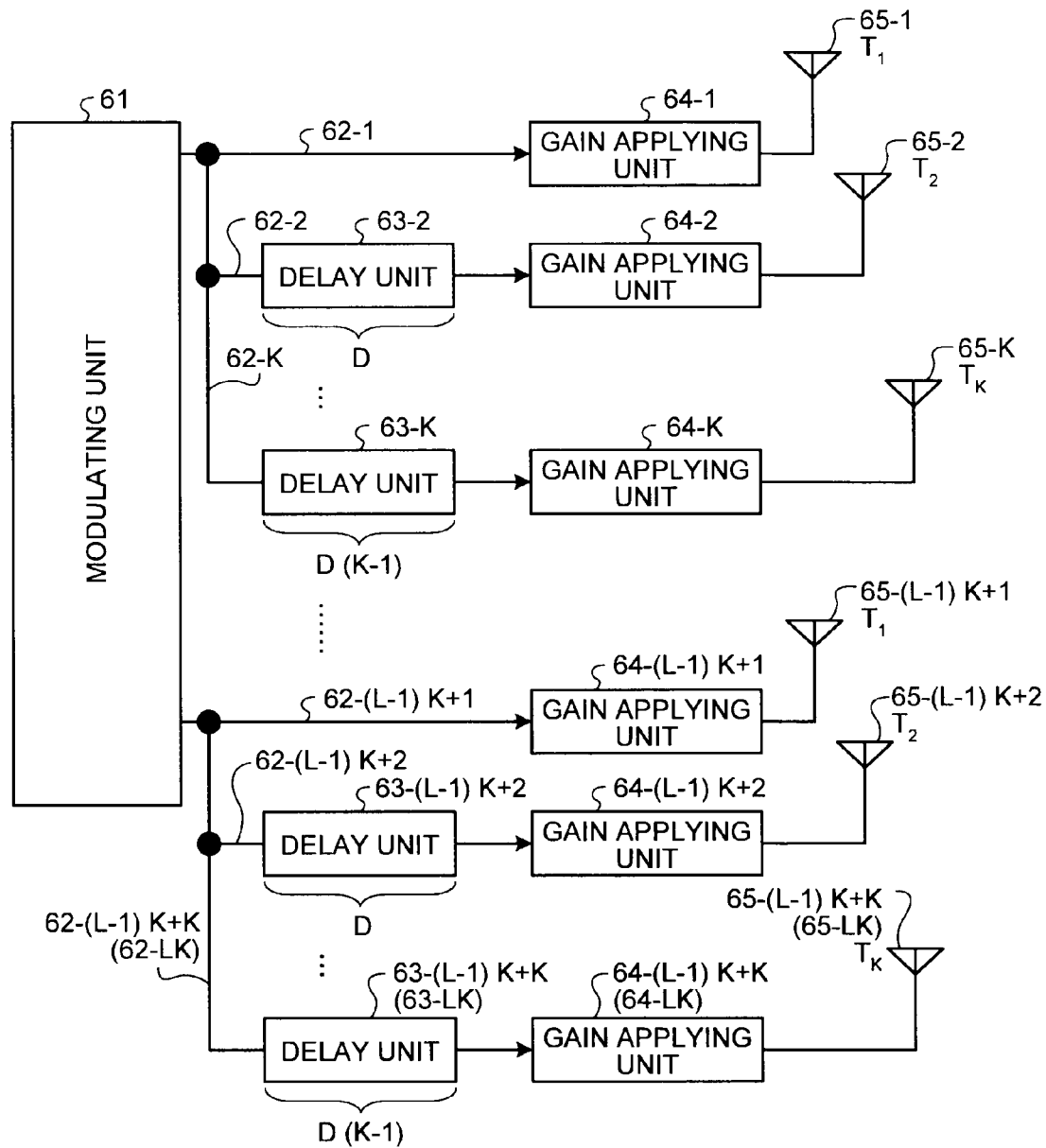
FIG. 9 is a configuration example of a transmission device.

FIG. 9 is a configuration example of the transmission device. The transmission device includes a modulating unit 61, signal lines 62-1 to 62-LK, delay units 63-2 to 63-K, 63-K+2 to 63-K+K, . . . , and 63-(L−1)K+2 to 63-LK, gain applying units 64-1 to 64-LK, and transmission antennas 65-1 to 65-LK. The modulating unit 61 generates a transmission signal. The signal lines 62-1 to 62-LK are signal lines for signals that are branched by the same number as the number of transmission antennas. Each of the delay units 63-2 to 63-K, 63-K+2 to 63-K+K, . . . , and 63-(L−1)K+2 to 63-LK performs a delay process on a transmission signal. Each of the gain applying units 64-1 to 64-LK applies a complex gain to the transmission signal. Each of the transmission antennas 65-1 to 65-LK transmits the transmission signal to the receiving device. It can be said that the transmission device includes L transmission blocks each having K transmission antennas.

Figure 10:
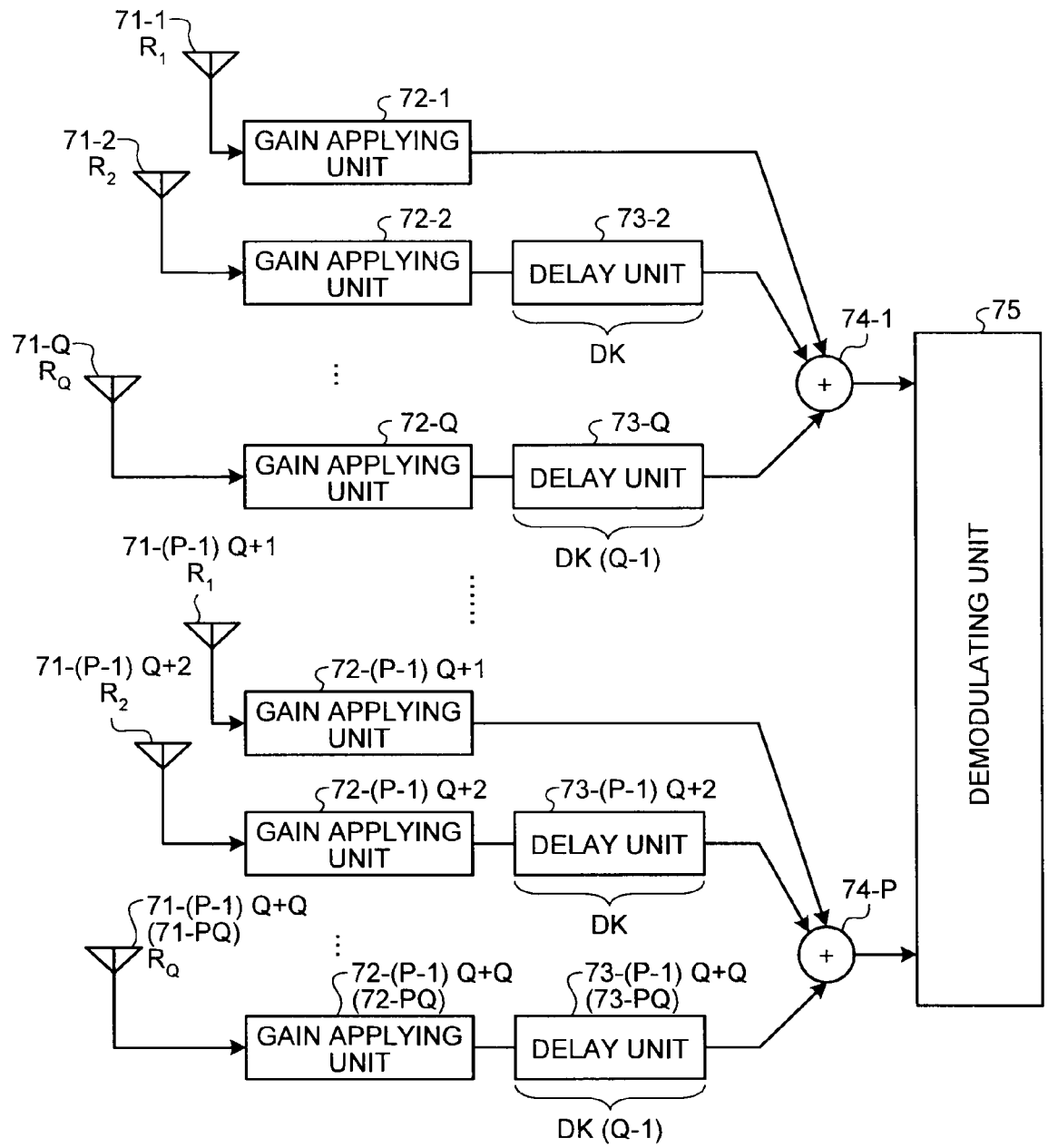
FIG. 10 is a configuration example of a receiving device.

FIG. 10 is a configuration example of the receiving device. The receiving device includes reception antennas 71-1 to 71-PQ, gain applying units 72-1 to 72-PQ, delay units 73-2 to 73-Q, 73-Q+2 to 73-Q+Q, . . . , and 73-(P−1)Q+2 to 73-PQ, combining units 74-1 to 74-P, and a demodulating unit 75. Each of the reception antennas 71-1 to 71-PQ receives a reception signal from the transmission device. Each of the gain applying units 72-1 to 72-PQ applies a complex gain to the reception signal. Each of the delay units 73-2 to 73-Q, 73-Q+2 to 73-Q+Q, . . . , and 73-(P−1)Q+2 to 73-PQ performs a delay process on the reception signal. Each of the combining units 74-1 to 74-P combines the delayed reception signals. The demodulating unit 75 performs a demodulating process on the combined reception signals. It can be said that the receiving device includes P reception blocks each including Q reception antennas.

In the transmission device, the modulating unit 61 generates a transmission signal and outputs L series of signals. The signal of each of the series is branched into K signals to obtain LK series of signals to be transmitted to the signal lines 62-1 to 62-LK, respectively. Among these signals, the transmission signals transmitted through the signal lines 62-2 to 62-K, . . . , and 62-(L−1)K+2 to 62-Lk are input to the delay units 63-2 to 63-K, . . . , and 63-(L−1)K+2 to 63-LK, respectively. As an example of an appropriate delay amount for achieving the diversity effect, the delay unit **63-*l*K+k** (0≤l≤L−1 and 2≤k≤K) applies D(k−1) by using the constant time D; however, the method of setting the delay amount for each of the transmission antennas is not limited thereto.

The transmission signals from the signal lines 62-1, . . . , and 62-(L−1)K+1 and the delayed transmission signals from the delay units 63-2 to 63-K, . . . , and 63-(L−1)K+2 to 63-LK are input to the gain applying unit 64-1 to 64-LK, respectively, and a complex gain is applied to each of the transmission signals. However, the process of applying the gain here is arbitrary, so that it can be skipped if it is not necessary for obtaining the diversity effect. In addition, positions of the delay units 63-2 to 63-K, . . . , and 63-(L−1)K+2 to 63-LK and the gain applying units 64-2 to 64-K, . . . , and 64-(L−1)K+2 to 64-LK can be changed with each other. The transmission antennas 65-1 to 65-LK respectively transmit the transmission signals to which the gain is applied by the gain applying units 64-1 to 64-LK to the receiving device.

In the receiving device, reception signals received by the reception antennas 71-1 to 71-PQ are input to the gain applying units 72-1 to 72-PQ, respectively. Although a complex gain is applied in each of the gain applying units 72-1 to 72-PQ, the process of applying the gain here is arbitrary, so that it can be skipped if it is not necessary for obtaining the diversity effect. The reception signals from the gain applying units 72-2 to 72-Q, . . . , and 72-(P−1)Q+2 to 72-PQ are input to the delay units 73-2 to 73-Q, . . . , and 73-(P−1)Q+2 to 73-PQ, respectively, and as an example of an appropriate delay amount for achieving the diversity effect, the delay unit **73-*p*Q+q (0≤p≤P−1 and 2≤q≤Q) applies DK(q−1) by using the constant time D; however, the method of setting the delay amount for each of the reception antennas is not limited thereto. In addition, positions of the gain applying units 72-2 to 72-Q, . . . , and 72-(P−1)Q+2 to 72-PQ and the delay units 73-2 to 73-Q, . . . , and 73-(P−1)Q+2 to 73-PQ can be changed with each other. The combining units 74-1 to 74-P combine the reception signals from the gain applying units 72-1, . . . , and 72-(P−1)Q+1 and the delayed reception signals from the delay units 73-2 to 73-Q, . . . , and 73-(P−1)Q+2 to 73-PQ. Thereafter, the demodulating unit 75** performs a demodulating process of the combined reception signal.

In units of the transmission block and the reception block, the method of applying the delay amount is same as that in the first embodiment.

In the present embodiment, although the signal processed at each of the delay units 63-2 to 63-K, 63-K+2 to 63-K+K, . . . , and 63-(L−1)K+2 to 63-LK, 73-2 to 73-Q, 73-Q+2 to 73-Q+Q, . . . , and 73-(P−1)Q+2 to 73-PQ is not limited to an analog signal or a digital signal, even with the analog signal, it is possible to perform the delay process with an amount corresponding to the delay amount described in the present embodiment.

As explained above, in the present embodiment, a delay same as that in the first embodiment is applied for each of the transmission blocks of the transmission device and each of the reception blocks of the receiving device. With this configuration, even in a case of the MIMO space division multiplexing transmission, effects identical to those of the first embodiment can be obtained. Furthermore, because the delay process described in the present embodiment increases the number of multipath of the transmission line in an equivalent manner, a reduction of spatial correlation between the transmission and reception branches takes effect, so that it is possible to enhance reception separation capability of space division multiplexed signals at the time of the space division multiplexing transmission.

Fourth Embodiment

In the present embodiment, a delay amount considering a delay of a signal in a multipath transmission line is applied in a transmission device and a receiving device.

The present embodiment explains features different from those of the first embodiment.

Figure 11:
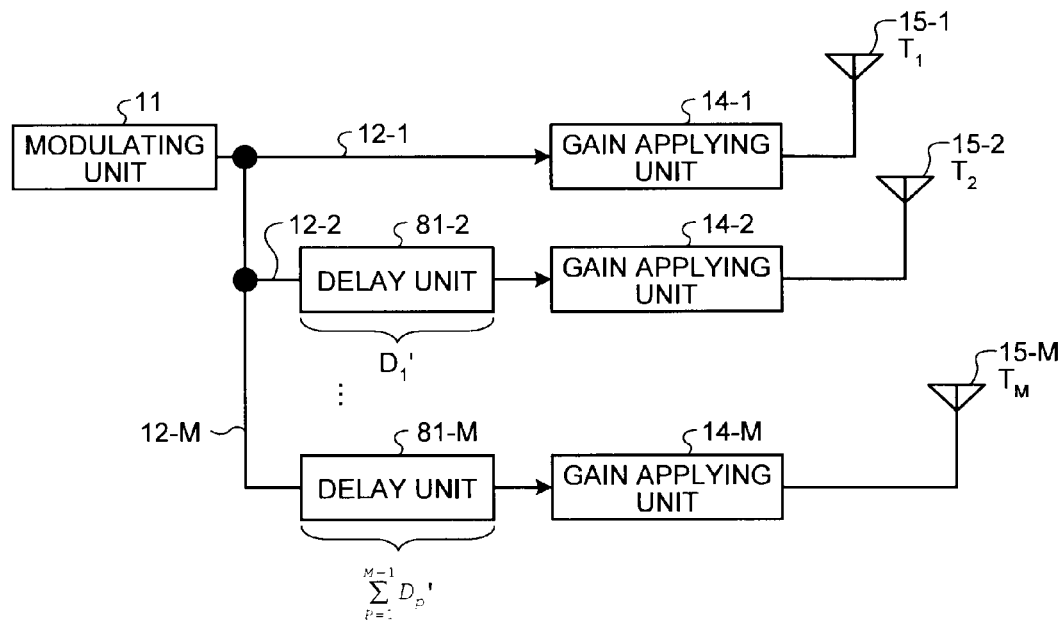
FIG. 11 is a configuration example of a transmission device.

FIG. 11 is a configuration example of the transmission device. The transmission device includes the modulating unit 11, the signal lines 12-1 to 12-M, delay units 81-2 to 81-M, the gain applying units 14-1 to 14-M, and the transmission antennas 15-1 to 15-M. Each of the delay units 81-2 to 81-M performs a delay process on the transmission signal.

Figure 12:
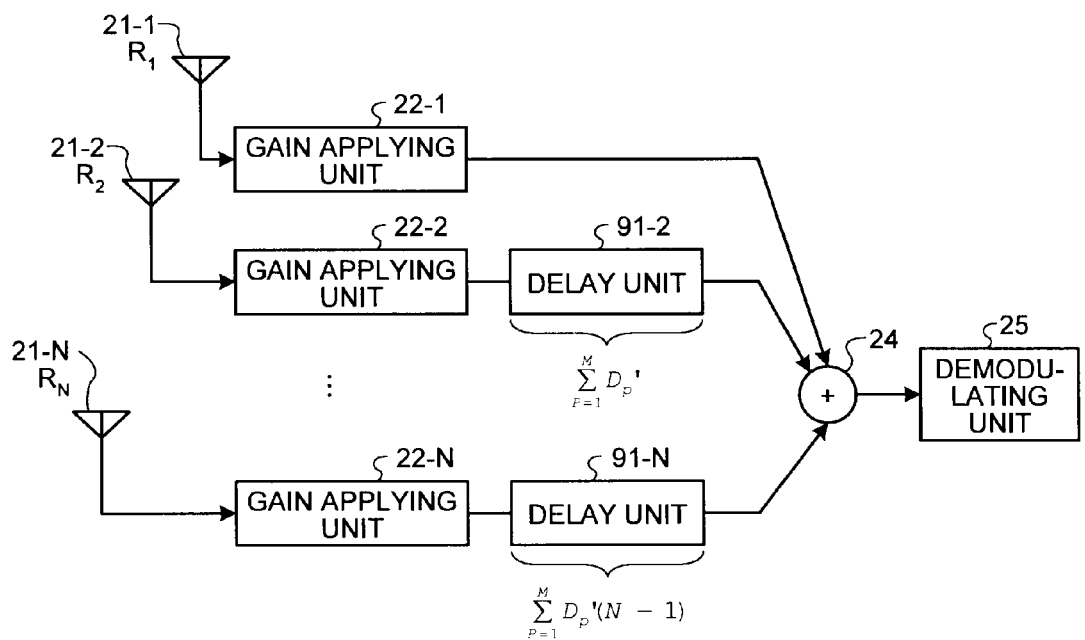
FIG. 12 is a configuration example of a receiving device.

FIG. 12 is a configuration example of the receiving device. The receiving device includes the reception antennas 21-1 to 21-N, the gain applying units 22-1 to 22-N, delay units 91-2 to 91-N, the combining unit 24, and the demodulating unit 25. Each of the delay units 91-2 to 91-N performs a delay process on the reception signal.

In this case, there exist MN ways of transmission lines $H_{i,j}$ from the transmission antenna **15-*i* (1≤i≤M) to the reception antenna 21-*j* (1≤j≤N). In transmission lines from the transmission antenna 15-*i* to all N reception antennas, the maximum delay amount of an arrival wave is set to $D_i$. That is, $D_i$ represents a time difference between an arrival time of an arrival wave that first arrives at any one of the reception antennas 21-1 to 21-N in the transmission lines and an arrival time of an arrival wave that last arrives at any one of the reception antennas 21-1 to 21-N** in the transmission lines. Subsequently, M (the same number as the number of transmission antennas) $D_i'$ is determined that satisfies "$D_i' > D_i$". As for a calculation of these delay amounts, for example, it can be achieved by estimating a transmission line by transmission line estimation or the like using a pilot symbol at the receiving device and acquiring a delay profile by, for example, notifying the estimated transmission line to the transmission device.

In the transmission device, the delay units 81-2 to 81-M applies a delay amount represented by the following Equation (2) at the delay unit 81-$i$ ($2 \le i \le M$), as an example of an appropriate delay amount for achieving the diversity effect. That is, the delay unit 81-$i$ ($2 \le i \le M$) applies a total delay amount until the delay units 81-1 to 81-($i$–1). The transmission signal from the signal line 12-1 and the delayed transmission signals from the delay units 81-2 to 81-M are input to the gain applying units 14-1 to 14-M, respectively, and each of the gain applying units 14-1 to 14-M applies a complex gain to each of the transmission signals; however, the method of setting the delay amount for each of the transmission antennas is not limited thereto.

[Equation 2]

$$\sum_{p=1}^{i-1} D'_p \quad (2)$$

In the receiving device, the reception signals from the gain applying units 22-2 to 22-N are input to the delay units 91-2 to 91-N, respectively, and as an example of an appropriate delay amount for achieving the diversity effect, the delay unit 91-$j$ ($2 \le j \le N$) applies a delay amount represented by the following Equation (3); however, the method of setting the delay amount for each of the reception antennas is not limited thereto.

[Equation 3]

$$\sum_{p=1}^{M} D'_p (j-1) \quad (3)$$

Figure 13:
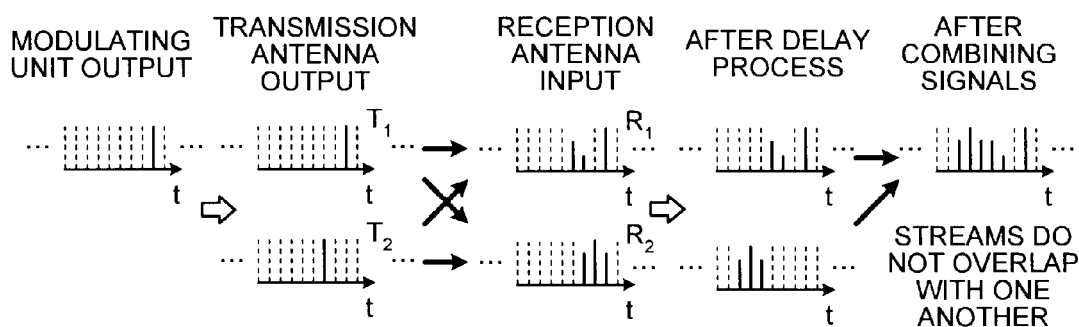
FIG. 13 is an explanatory diagram of stream combining.

Specifically, there is explained an example of combining streams in which the number of the transmission antennas is set to two, the number of reception antennas is set to two, the maximum delay amount is set to one symbol, with no arrival time difference between the transmission lines. FIG. 13 is an explanatory diagram of stream combining.

The transmission device outputs a signal output from the modulating unit 11 and signals that are respectively delayed by delay amounts of 2D by the delay units 81-2 from each of the two transmission antennas 15-1 and 15-2. The receiving device receives three signals at each of the two reception antennas 21-1 and 21-2, and delays signals received at one reception antenna 21-2 by 4D at the delay unit 91-2. Thereafter, the receiving device combines at the combining unit 24 the signals of the reception antenna 21-2 on which the delay amount is performed and the signals of the other reception antenna 21-1 on which no delay process is performed. By applying such a delay amount, timings of the main signals indicated by the solid line are not overlapped with each other in an output of the combining unit 24.

In the present embodiment, although the signal processed at each of the delay units 81-2 to 81-M and 91-2 to 91-N is not limited to an analog signal or a digital signal, even with the analog signal, it is possible to perform the delay process with an amount corresponding to the delay amount described in the present embodiment.

As explained above, in the present embodiment, even when the transmission signal passes through a multipath transmission line, the transmission device applies a delay such that the timings of the main signals are not overlapped with each other at the transmission antennas. In addition, the receiving device applies a delay to signals received at a plurality of reception antennas such that the timings of the main signals are not overlapped with each other at the time of combining the signals. With this configuration, effects identical to those of the first embodiment can be obtained.

The method of determining the delay amount explained in the present embodiment can be also applied to the third embodiment.

Fifth Embodiment

In the present embodiment, a delay amount considering a delay of a signal in a multipath transmission line is applied in a transmission device and a receiving device. The present embodiment explains features different from those of the fourth embodiment.

The configurations of the transmission device and the receiving device are the same as those in the fourth embodiment. In this case, there exist MN ways of transmission lines $H_i$, j from the transmission antenna 15-$i$ ($1 \le i \le M$) to the reception antenna 21-$j$ ($1 \le j \le N$). In transmission lines from the transmission antenna 15-$i$ to all N reception antennas, a delay amount (a time difference between a transmission time and an arrival time) of an arrival wave that first arrives at any one of the reception antennas 21-1 to 21-N in the transmission lines is set to $D_i^*$. Further, a delay amount (a time difference between a transmission time and an arrival time) of an arrival wave that last arrives at any one of the reception antennas 21-1 to 21-N in the transmission lines is set to $D_i$. Subsequently, M (the same number as the number of transmission antennas) $D_i'$ is determined that satisfies "$D_i' > (D_i - D_{i+1}^*)$".

In the transmission device, the delay units 81-2 to 81-M applies a delay amount represented by the Equation (3) at the delay unit 81-$i$ ($2 \le i \le M$), as an example of an appropriate delay amount for achieving the diversity effect.

In the receiving device, the delay units 91-2 to 91-N apply the delay amount represented by the Equation (3) at the delay unit 91-$j$ ($2 \le j \le N$), as an example of an appropriate delay amount for achieving the diversity effect.

In the present embodiment, although the signal processed at each of the delay units 81-2 to 81-M and 91-2 to 91-N is not limited to an analog signal or a digital signal, even with the analog signal, it is possible to perform the delay process with an amount corresponding to the delay amount described in the present embodiment.

As explained above, in the present embodiment, when the transmission signal passes through a multipath transmission line, the transmission device applies a delay considering a delay of a leading wave in the transmission line. With this configuration, effects identical to those of the fourth embodiment can be obtained with a smaller delay amount as compared to the fourth embodiment.

The method of determining the delay amount explained in the present embodiment can be also applied to the third embodiment.

Sixth Embodiment

In the present embodiment, a delay amount considering an inter-code interference is applied in a transmission device and a receiving device. In the present embodiment, it is assumed that a guard interval or a guard time, which is widely used in multicarrier communications such as OFDM (Orthogonal Frequency Division Multiplexing), is attached to a head of a modulation symbol, to handle an inter-code interference due to a delay wave of a transmission line. The present embodiment explains features different from those of the first embodiment.

Figure 14:
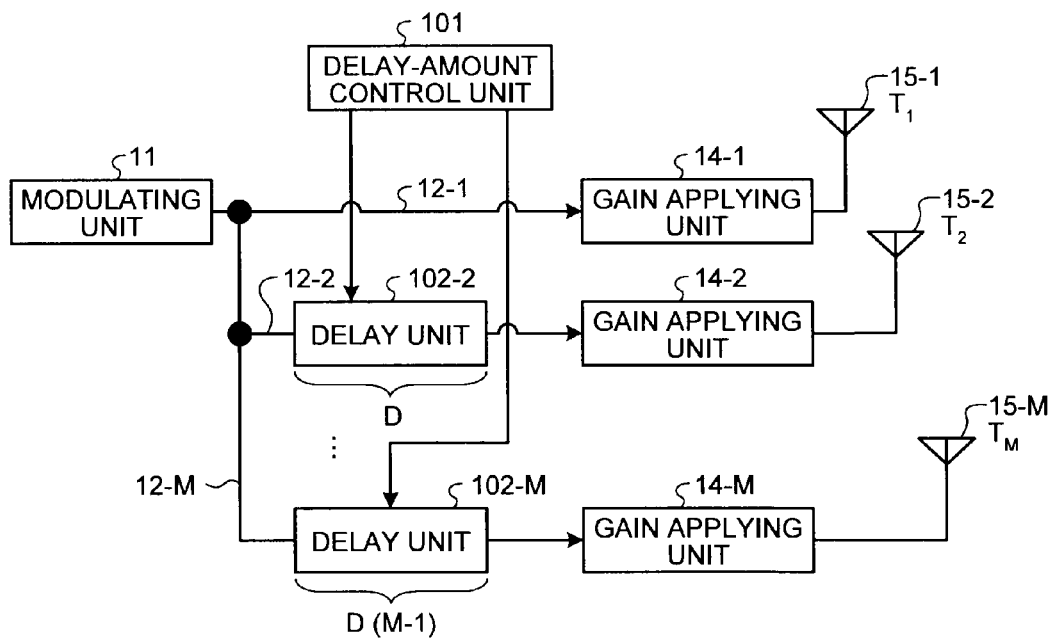
FIG. 14 is a configuration example of a transmission device.

FIG. 14 is a configuration example of the transmission device. The transmission device includes the modulating unit 11, the signal lines 12-1 to 12-M, a delay-amount control unit 101, delay units 102-2 to 102-M, the gain applying units 14-1 to 14-M, and the transmission antennas 15-1 to 15-M. The delay-amount control unit 101 controls a delay amount of each of the delay units. Each of the delay units 102-2 to 102-M performs a delay process on a transmission signal.

Figure 15:
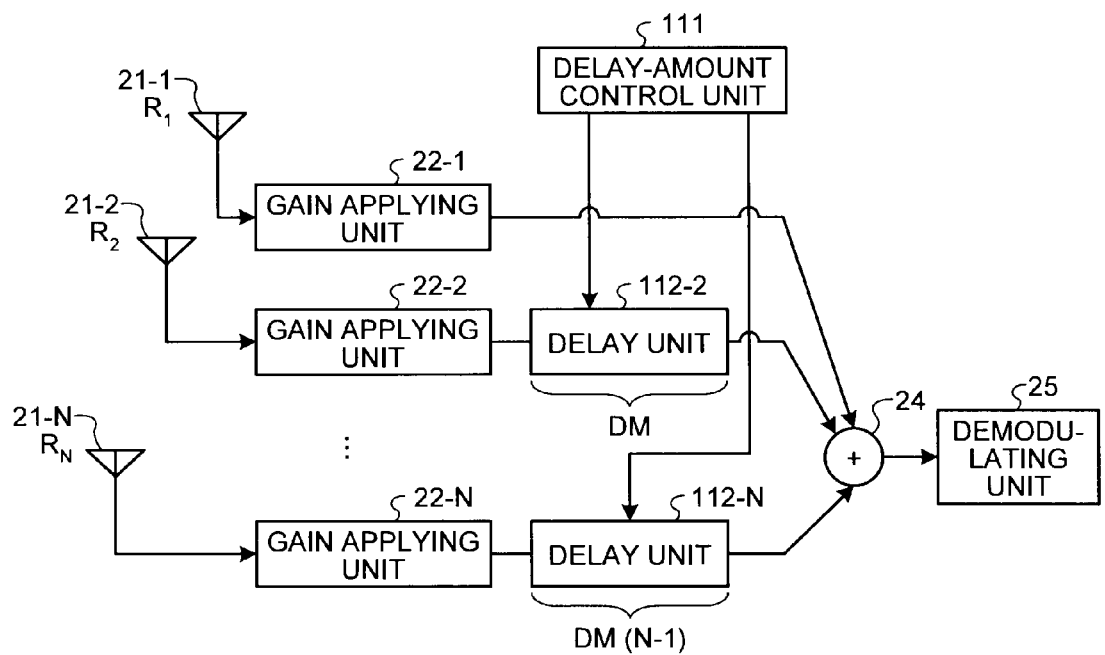
FIG. 15 is a configuration example of a receiving device.

FIG. 15 is a configuration example of the receiving device. The receiving device includes the reception antennas 21-1 to 21-N, the gain applying units 22-1 to 22-N, a delay-amount control unit 111, delay units 112-2 to 112-N, the combining unit 24, and the demodulating unit 25. The delay-amount control unit 111 controls a delay amount of each of the delay units. Each of the delay units 112-2 to 112-N performs a delay process on a reception signal.

In the transmission device, when the length of the guard interval or the guard time is set to G_len and a time difference between an arrival time of a leading wave that first arrives at any one of the reception antennas 21-1 to 21-N in the whole transmission lines and an arrival time of a delay wave that last arrives at any one of the reception antennas 21-1 to 21-N in the whole transmission lines is set to a maximum delay amount D_len, the delay-amount control unit 101 determines D such that "G_len≥D_len+D(MN−1)" is satisfied. Furthermore, the delay units 102-2 to 102-M apply D(i−1) at the delay unit 102-$i$ (2≤i≤M) as an example of an appropriate delay amount for achieving the diversity effect. As for a calculation of these delay amounts, for example, it can be achieved by estimating a transmission line by the transmission line estimation or the like using a pilot symbol at the receiving device and acquiring a delay profile by, for example, notifying the estimated transmission line to the transmission device.

In the receiving device, the delay-amount control unit 111 determines the delay amount by the same method as that used in the delay-amount control unit 101. Further, the delay units 112-2 to 112-N apply DM(j−1) at the delay unit 112-$j$ (2≤j≤N) as an example of an appropriate delay amount for achieving the diversity effect.

In the present embodiment, although the signal processed at each of the delay units 102-2 to 102-M and 112-2 to 112-N is not limited to an analog signal or a digital signal, even with the analog signal, it is possible to perform the delay process with an amount corresponding to the delay amount described in the present embodiment.

As explained above, in the present embodiment, the transmission device applies a delay such that the transmission signal does not experience an inter-code interference at the reception antenna. Furthermore, the receiving device applies a delay to signals received at a plurality reception antennas not to cause an inter-code interference at the time of combining the signals. With this configuration, effects identical to those of the first embodiment can be obtained.

Seventh Embodiment

In the present embodiment, a delay amount considering an inter-code interference is applied in a transmission device and a receiving device. The present embodiment explains features different from those of the sixth embodiment.

Figure 16:
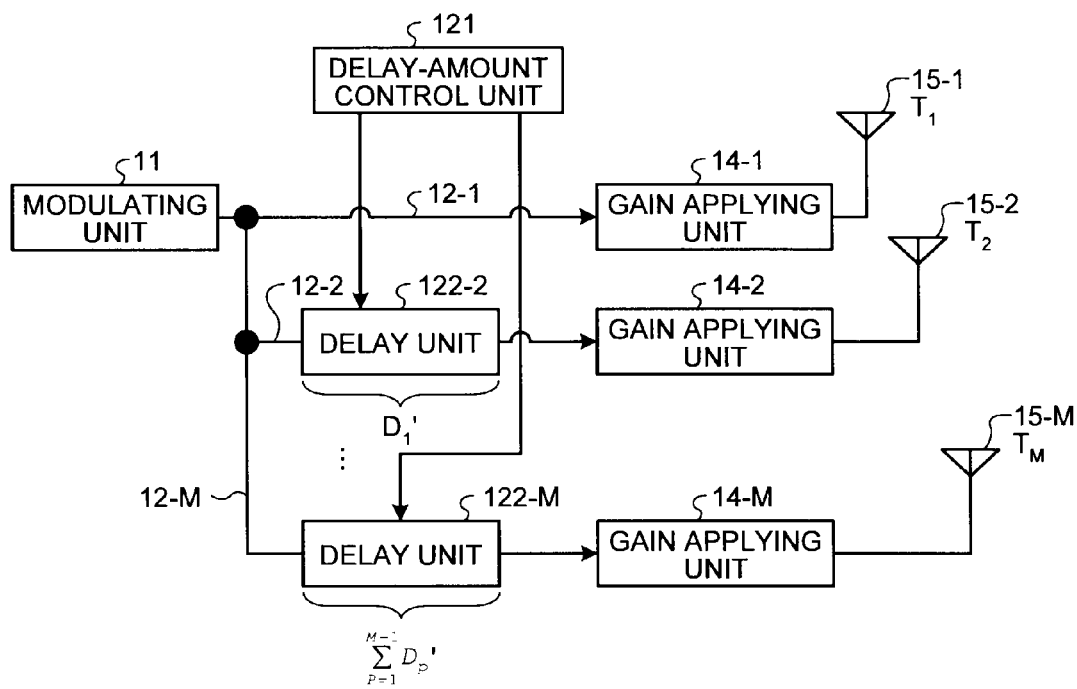
FIG. 16 is a configuration example of a transmission device.

FIG. 16 is a configuration example of the transmission device. The transmission device includes the modulating unit 11, the signal lines 12-1 to 12-M, a delay-amount control unit 121, delay units 122-2 to 122-M, the gain applying units 14-1 to 14-M, and the transmission antennas 15-1 to 15-M. The delay-amount control unit 121 controls a delay amount of each of the delay units. Each of the delay units 122-2 to 122-M performs a delay process on a transmission signal.

Figure 17:
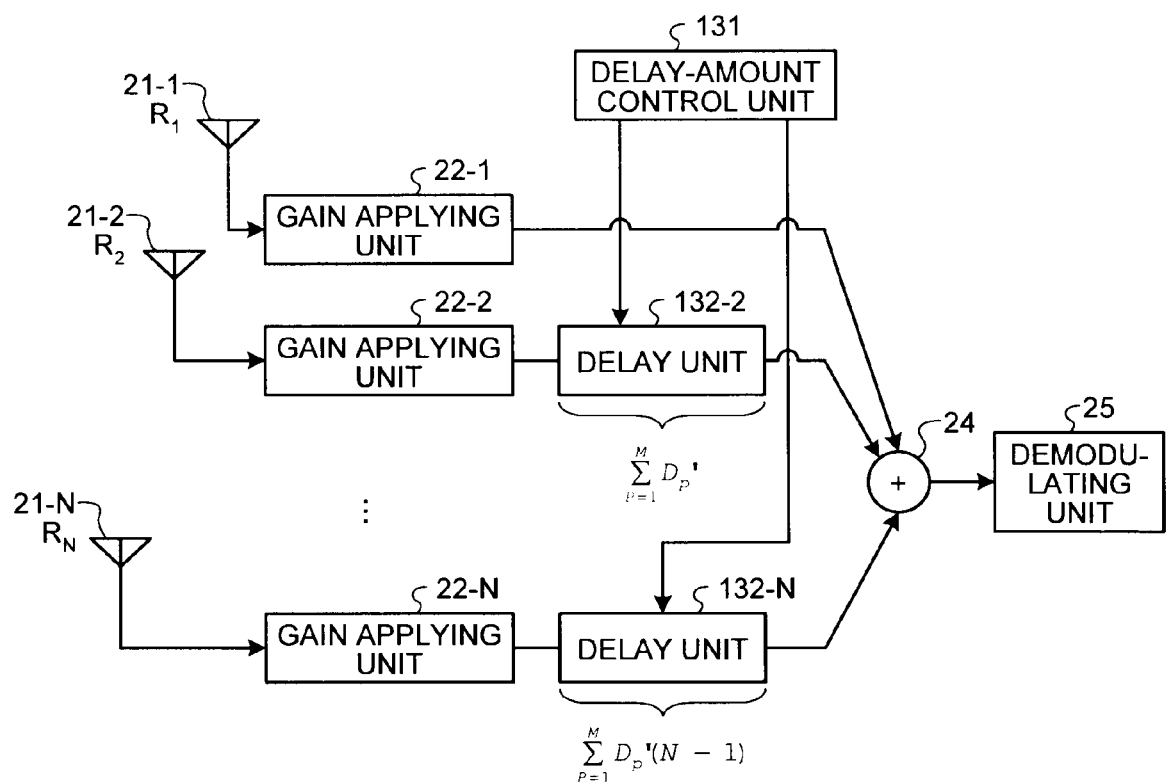
FIG. 17 is a configuration example of a receiving device.

FIG. 17 is a configuration example of the receiving device. The receiving device includes the reception antennas 21-1 to 21-N, the gain applying units 22-1 to 22-N, a delay-amount control unit 131, delay units 132-2 to 132-N, the combining unit 24, and the demodulating unit 25. The delay-amount control unit 131 controls a delay amount of each of the delay units. Each of the delay units 132-2 to 132-N performs a delay process on a reception signal.

In this case, there exist MN ways of transmission lines $H_j$, j from the transmission antenna 15-$i$ (1≤i≤M) to the reception antenna 21-$j$ (1≤j≤N). In transmission lines from the transmission antenna 15-$i$ to all N reception antennas, among arrival waves of which reception powers exceed a predetermined value γ in transmission lines, a delay amount (a time difference between a transmission time and an arrival time) of an arrival wave that first arrives at any one of the reception antennas 21-1 to 21-N is set to $D_i^*$. Further, among the arrival waves of which the reception powers exceed the predetermined value γ in transmission lines, a delay amount (a time difference between a transmission time and an arrival time) of an arrival wave that last arrives at any one of the reception antennas 21-1 to 21-N is set to $D_i$.

In the transmission device and the receiving device, when the length of the guard interval or the guard time is set to G_len and a time difference between an arrival time of a leading wave that first arrives at any one of the reception antennas 21-1 to 21-N in the whole transmission lines and an arrival time of a delay wave that last arrives at any one of the reception antennas 21-1 to 21-N in the whole transmission lines is set to a maximum delay amount D_len, the delay-amount control units 121 and 131 determine γ such that $D_i'>(D_i-D_{i+1}^*)$ (where $D_M'=D_M$) is satisfied and the following Equation (4) is satisfied, thus setting M (the same number as the number of transmission antennas) $D_1', \ldots$, and $D_M'$. As for a calculation of these delay amounts, for example, it can be achieved by estimating a transmission line by the transmission line estimation or the like using a pilot symbol at the receiving device and acquiring a delay profile by, for example, notifying the estimated transmission line to the transmission device.

[Equation 4]

$$G\_len > D\_len + \sum_{p=1}^{M-1} D_p' \qquad (4)$$

In the transmission device, the delay units 122-2 to 122-M apply a delay amount represented by the Equation (2) by using Di' determined by the delay-amount control unit 121 at the delay unit 122-$i$ (2≤i≤M). The transmission signal from the signal line 12-1 and the delayed transmission signals from the delay units 122-2 to 122-M are input to the gain applying units 14-1 to 14-M, respectively, and each of the gain applying units 14-1 to 14-M applies a complex gain to each of the transmission signals.

In the receiving device, the delay units 132-2 to 132-N apply a delay amount represented by the Equation (3) at the delay unit 132-$j$ (2≤j≤N) as an example of an appropriate delay amount for achieving the diversity effect.

In the present embodiment, although the signal processed at each of the delay units 122-2 to 122-M and 132-2 to 132-N is not limited to an analog signal or a digital signal, even with the analog signal, it is possible to perform the delay process with an amount corresponding to the delay amount described in the present embodiment.

As explained above, in the present embodiment, by the transmission device and the receiving device apply a delay such that signals exceeding a predetermined reception power do not make an inter-code interference, main signals exceeding a predetermined reception power can be combined without being temporally overlapped with each other at the receiving device. With this configuration, effects identical to those of the first embodiment can be obtained.

The method of determining the delay amount explained in the present embodiment can be also applied to the third embodiment.

Eighth Embodiment

In the present embodiment, an antenna for performing a delay process is selected in a transmission device and a receiving device. The present embodiment explains features different from those of the first embodiment.

Figure 18:
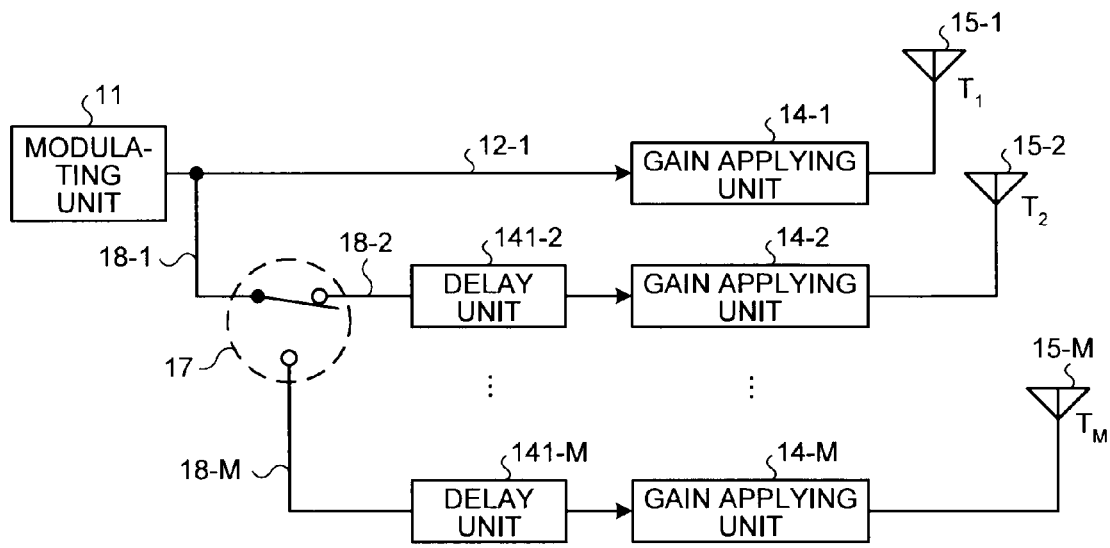
FIG. 18 is a configuration example of a transmission device.

FIG. 18 is a configuration example of the transmission device. The transmission device includes the modulating unit 11, the signal lines 12-1 and 18-1 to 18-M, a transmission-antenna selecting unit 17, delay units 141-2 to 141-M, the gain applying units 14-1 to 14-M, and the transmission antennas 15-1 to 15-M. The transmission-antenna selecting unit 17 selects, among candidates of the transmission antennas 15-2 to 15-M for transmitting a delayed signal, an antenna for actually transmitting the delayed signal. Each of the delay units 141-2 to 141-M performs a delay process on a transmission signal.

Figure 19:
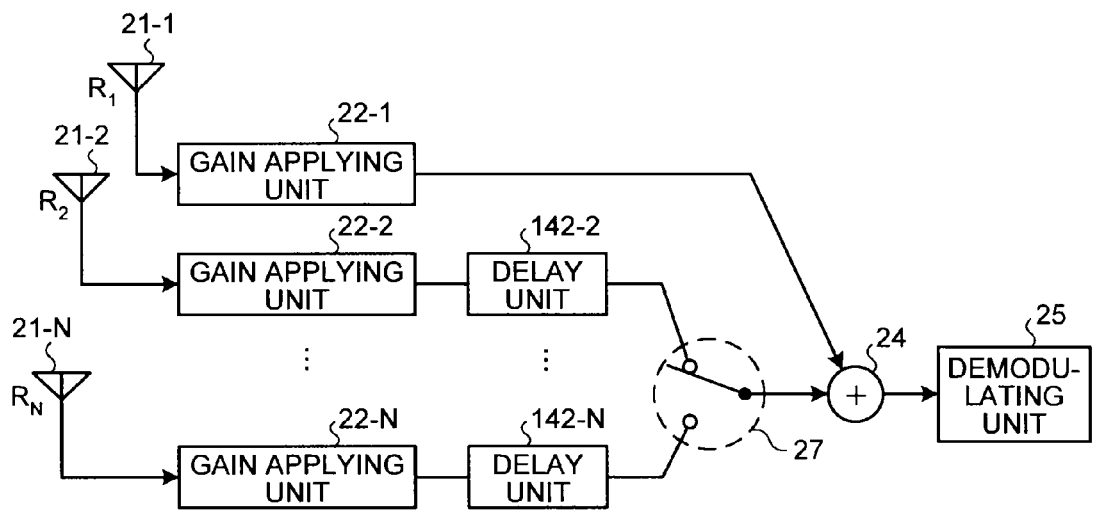
FIG. 19 is a configuration example of a receiving device.

FIG. 19 is a configuration example of the receiving device. The receiving device includes the reception antennas 21-1 to 21-N, the gain applying units 22-1 to 22-N, delay units 142-2 to 142-N, a reception-antenna selecting unit 27, the combining unit 24, and the demodulating unit 25. The reception-antenna selecting unit 27 selects, among candidates of the reception antennas 21-2 to 21-N, an antenna for actually combining with a signal received at the reception antenna 21-1. Each of the delay units 142-2 to 142-N performs a delay process on a reception signal.

In the transmission device, a transmission signal generated by the modulating unit 11 is branched into the signal lines 12-1 and 18-1. The signal branched into the signal line 12-1 is processed in the same manner as the first embodiment and transmitted from the transmission antenna 15-1. The signal branched into the signal line 18-1 is input to the transmission-antenna selecting unit 17. The transmission-antenna selecting unit 17 selects an antenna from the transmission antennas 15-2 to 15-M, and connects the selected antenna and its corresponding signal line. A reference for selecting an antenna includes selecting an antenna having the highest transmission line gain. As for a calculation of the transmission line gain, it can be calculated by performing the transmission line estimation by the transmission-antenna selecting unit 17 switching a transmission antenna in a transmission-line estimating period using a pilot symbol or the like. For example, in the transmission-line estimating period, the transmission-antenna selecting unit 17 first selects the transmission antenna 15-2 to perform the transmission line estimation at the receiving device, obtains a transmission line gain, and feeds it back to the transmission device.

The transmission-antenna selecting unit 17 then selects the transmission antenna 15-3 to perform the transmission line estimation at the receiving device, obtains a transmission line gain, and feeds it back to the transmission device. By performing the procedure on the transmission antennas 15-2 to 15-M described above, transmission line gains of all combinations of the transmission antennas can be obtained.

The selected transmission antenna is set to 15-$i$ (2≤j≤M). The delay unit 141-$i$ applies a delay to a signal input from the signal line 18-$i$. A delay amount applied here is determined by any one of methods according to the first to seventh embodiments. The transmission signal from the signal line 12-1 and the delayed transmission signal from the delay unit 141-$i$ are input to the gain applying units 14-1 and 14-$i$, respectively, and each of the gain applying units 14-1 and 14-$i$ applies a complex gain to each of the transmission signals.

In the receiving device, the reception-antenna selecting unit 27 selects an antenna from the reception antennas 21-2 to 21-N, and connects a signal line corresponding to the selected antenna and the combining unit 24. A reference for selecting an antenna includes, in the same manner as the selecting reference in the transmission-antenna selecting unit 17, selecting an antenna having the highest transmission line gain. For example, in the transmission-line estimating period, the reception-antenna selecting unit 27 first selects the reception antenna 21-2 to obtain a transmission line gain by performing the transmission line estimation. The reception-antenna selecting unit 27 then selects the reception antenna 21-3 to obtain a transmission line gain by performing the transmission line estimation. By performing the procedure on the reception antennas 21-2 to 21-N described above, transmission line gains of all combinations of the reception antennas can be obtained.

The selected reception antenna is set to 21-$j$ (2≤j≤N). The delay unit 142-$j$ applies a delay to a signal input from the gain applying unit 22-$j$. A delay amount applied here is determined by any one of methods according to the first to seventh embodiments. The combining unit 24 combines the reception signal from the gain applying unit 22-1 and the delayed reception signal from the delay unit 142-$j$.

As explained above, in the present embodiment, a transmission antenna for performing the delay process is selected at the transmission device, and a reception antenna for performing the delay process is selected at the receiving device. With this configuration, it is possible to reduce a power consumption of an unused antenna and related circuits by suppressing the number of actually used antennas and related circuits to the minimum.

Ninth Embodiment

In the present embodiment, antennas used for transmitting and receiving a signal are selected at a transmission device and a receiving device. The present embodiment explains features different from those of the eighth embodiment.

Figure 20:
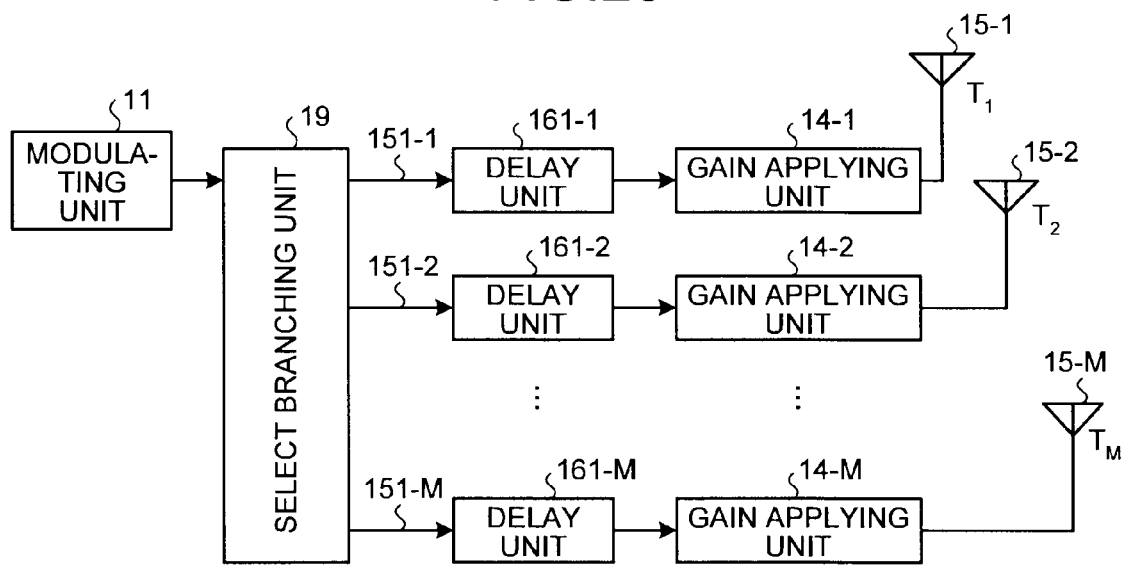
FIG. 20 is a configuration example of a transmission device.

FIG. 20 is a configuration example of the transmission device. The transmission device includes the modulating unit 11, a select branching unit 19, signal lines 151-1 to 151-M, delay units 161-1 to 161-M, the gain applying units 14-1 to 14-M, and the transmission antennas 15-1 to 15-M. The select branching unit 19 selects, among candidates of the transmission antennas 15-1 to 15-M for transmitting signal, an antenna for actually transmitting the signal. Each of the delay units 161-1 to 161-M performs a delay process on the transmission signal.

Figure 21:
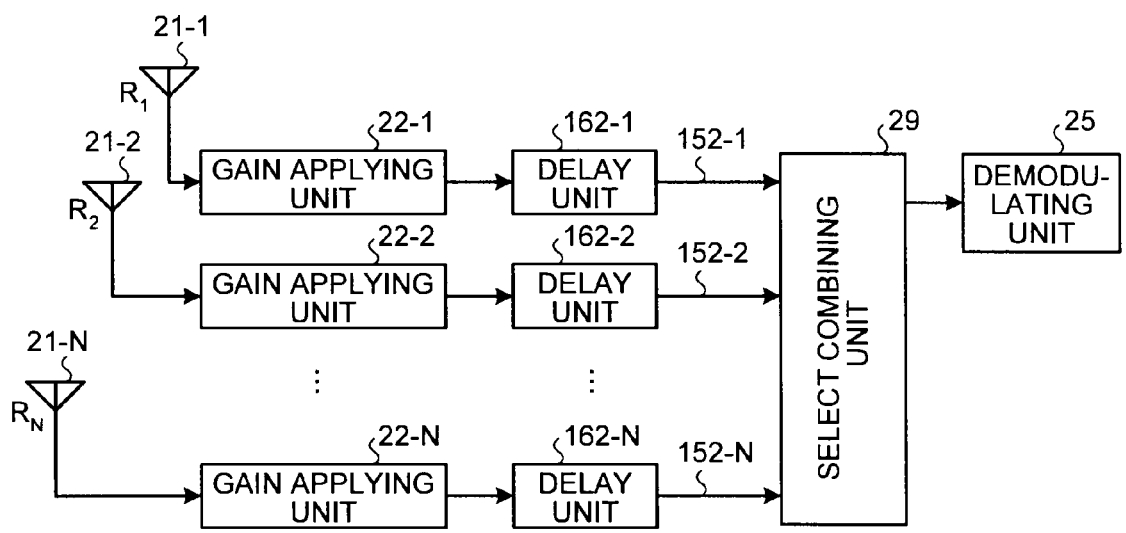
FIG. 21 is a configuration example of a receiving device.

FIG. 21 is a configuration example of the receiving device. The receiving device includes the reception antennas 21-1 to 21-N, the gain applying units 22-1 to 22-N, delay units 162-1 to 162-N, signal lines 152-1 to 152-N, a select combining unit 29, and the demodulating unit 25. The select combining unit 29 selects an antenna for combining among candidates of the reception antennas 21-1 to 21-N. Each of the delay units 162-1 to 162-N performs a delay process on the reception signal.

In the transmission device, a transmission signal generated by the modulating unit 11 is branched by the select branching unit 19. The select branching unit 19 selects at least one antenna among the transmission antennas 15-1 to 15-M. A reference for selecting the antenna includes taking a rank of the antennas by obtaining a transmission line gain at the time of selecting each of the antennas and selecting antennas having the highest transmission line gain from the top of the rank one by one under a condition of equal to or smaller than a defined number of antennas, selecting antennas from the top of the rank one by one under a condition satisfying a defined total transmission line gain and suppressing it to the minimum number of antennas and the like.

In this case, it is assumed that three transmission antennas are selected by the select branching unit 19. The selected transmission antennas are set to 15-$i$, 15-$j$, and 15-$k$ ($1 \le i, j, k \le M$, $i \ne j$, $j \ne k$, and $k \ne i$). The select branching unit 19 branches the signal into the signal lines 151-$i$, 151-$j$, and 151-$k$. Each of the delay units 161-$i$, 161-$j$, and 161-$k$ applies a delay to the input signal. Although a delay amount applied here is determined by any one of methods according to the first to seventh embodiments, it can be configured such that the delay is not applied to one of the selected antennas while relative delay amounts are set to the other antennas, to suppress the total delay amount to the minimum amount. The delayed transmission signals from the delay units 161-$i$, 161-$j$, and 161-$k$ are input to the gain applying units 14-$i$, 14-$j$, and 14-$k$, respectively, and each of the gain applying units 14-$i$, 14-$j$, and 14-$k$ applies a complex gain to each of the transmission signals.

In the receiving device, the select combining unit 29 selects antennas among the reception antennas 21-1 to 21-N, combines reception signals from signal lines corresponding to the selected antennas, and outputs a combined reception signal to the demodulating unit 25. A reference for selecting the antenna is same as the selecting reference used in the select branching unit 19.

In this case, it is assumed that two reception antennas are selected by the select combining unit 29. The selected reception antennas are set to 21-1 and 21-$m$ ($1 \le 1$, $m \le N$, and $1 \ne m$). The signal lines 152-$l$ and 152-$m$ are connected to the select combining unit 29. The delay units 162-$l$ and 162-$m$ apply a delay to signals input from gain applying units 22-$l$ and 22-$m$, respectively. Although a delay amount applied here is determined by any one of methods according to the first to seventh embodiments, it can be configured such that the delay is not applied to one of the selected antennas while relative delay amounts are set to the other antennas, to suppress the total delay amount to the minimum amount. The select combining unit 29 combines reception signals from the delay units 162-$l$ and 162-$m$.

As explained above, in the present embodiment, transmission antennas to be branched into are selected at the transmission device, and reception antennas for combining signals are selected at the receiving device. With this configuration, it is possible to improve the communication performance in an effective manner by selecting antennas having high transmission line gains. Furthermore, it is possible to reduce the power consumption of an unused antenna and related circuits by suppressing the number of actually using antennas and the number of driving related circuits to the minimum.

Tenth Embodiment

In the present embodiment, there is explained a wireless communication system in which the number of transmission antennas of a transmission device is set to LK, the number of outputs of a modulating unit is set to L, the number of reception antennas of a receiving device is set to PQ, and the number of inputs of a demodulating unit is set to P, and the MIMO space division multiplexing transmission is performed in the modulating unit and the demodulating unit. The present embodiment explains features different from those of the third embodiment.

Figure 22:
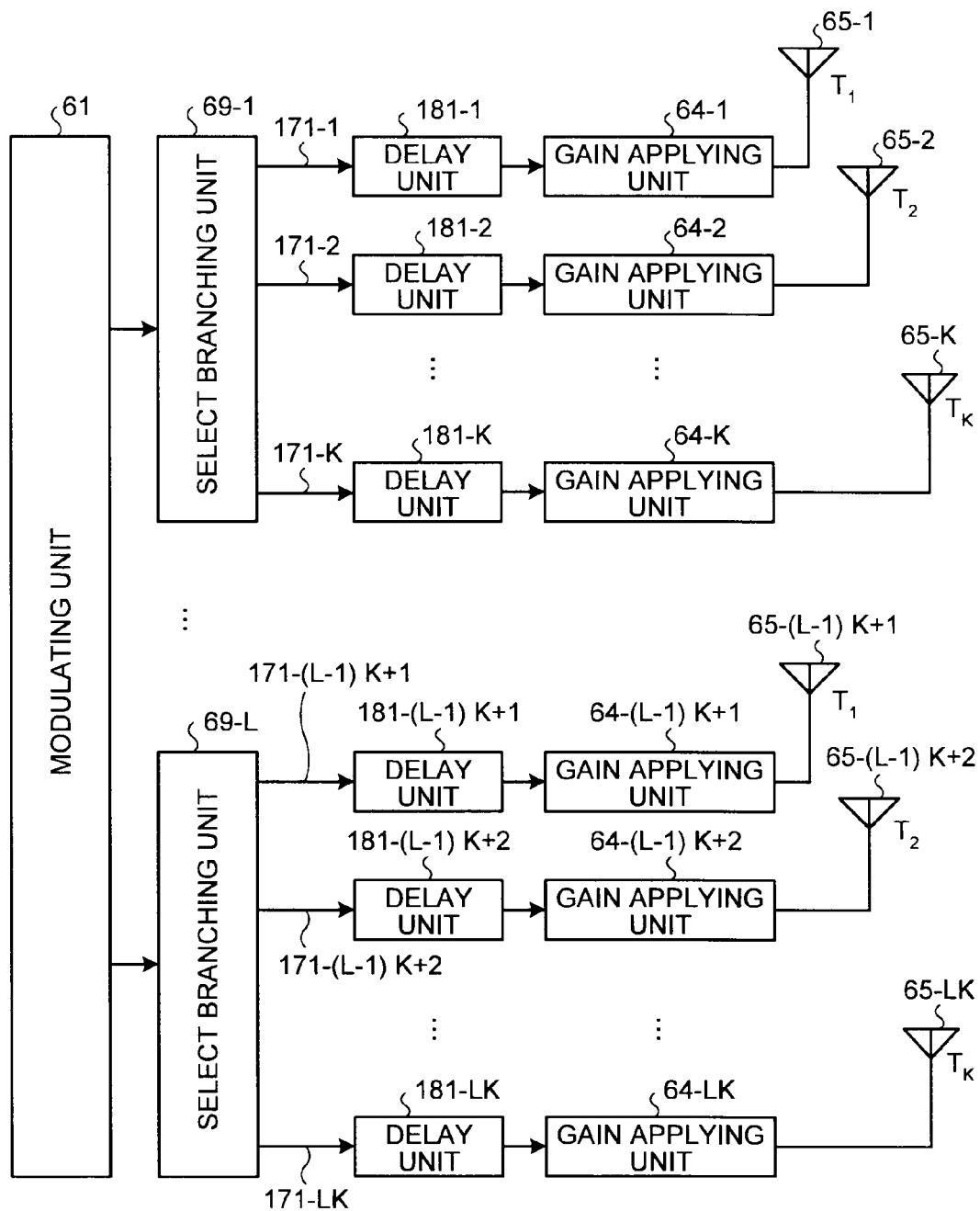
FIG. 22 is a configuration example of a transmission device.

FIG. 22 is a configuration example of the transmission device. The transmission device includes the modulating unit 61, select branching units 69-1 to 69-L, signal lines 171-1 to 171-LK, delay units 181-1 to 181-LK, the gain applying units 64-1 to 64-LK, and the transmission antennas 65-1 to 65-LK. The select branching unit 69-$l$ ($1 \le l \le L$) selects, among candidates of transmission antennas 65-$(l-1)$K+1 to 65-$l$K for transmitting a signal, an antenna for actually transmitting the signal, and connects it to a signal line corresponding to the selected antenna among the signal lines 171-$(l-1)$K+1 to 171-$l$K. Each of the delay units 181-1 to 181-LK performs a delay process on a transmission signal.

Figure 23:
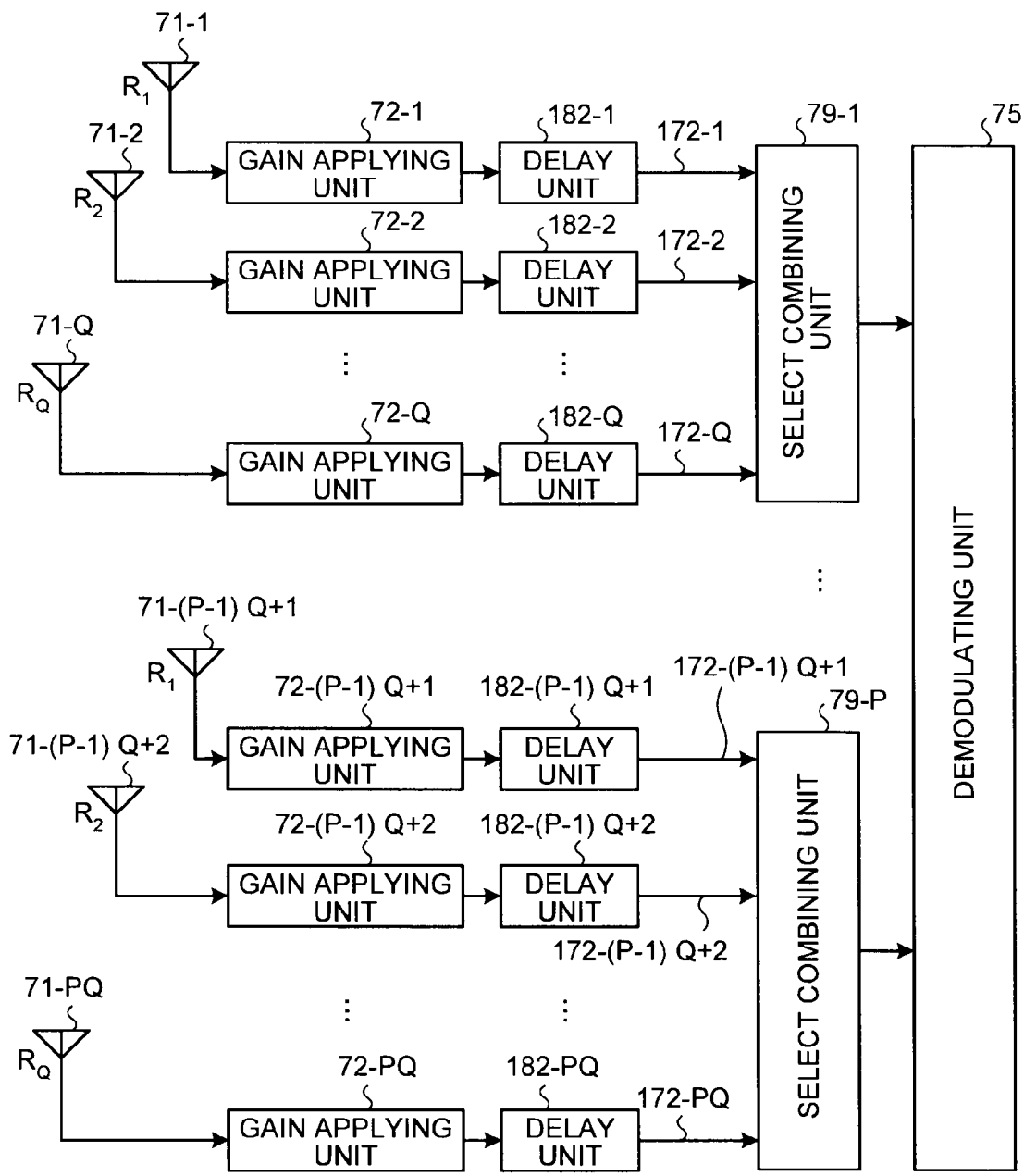
FIG. 23 is a configuration example of a receiving device.

FIG. 23 is a configuration example of the receiving device. The receiving device includes the reception antennas 71-1 to 71-PQ, the gain applying units 72-1 to 72-PQ, delay units 182-1 to 182-PQ, signal lines 172-1 to 172-PQ, select combining units 79-1 to 79-P, and the demodulating unit 75. Each of the delay units 182-1 to 182-PQ performs a delay process on a reception signal. A select combining unit 79-$p$ ($1 \le p \le P$) selects, among candidates of reception antennas 71-$(p-1)$Q+1 to 71-$p$Q for combining signals, antennas for actually combining the signals, and connects them to signal lines corresponding to the selected antennas among the signal lines 172-$(p-1)$Q+1 to 171-$p$Q.

In the transmission device, the modulating unit 61 generates L signal series. To make it simple, the l-th ($1 \le l \le L$) signal series is explained. In the following explanations, it is common to all of L transmission blocks with L independent operations. The l-th signal series is input to the select branching unit 69-$l$. The process of the select branching unit 69-$l$ is same as that in the ninth embodiment. However, a reference for selecting an antenna further includes, as well as the reference in the ninth embodiment, selecting an antenna having a low spatial correlation with antennas selected by the other select branching units 69-1 to 69-$l$-1 and 69-$l$+1 to 69-L, selecting an antenna with which the transmission line transmission line capacity increases, and the like. As for a calculation of the spatial correlation and the transmission line capacity, they can be calculated by performing the transmission line estimation by the select branching unit 69-1 switching a transmission antenna in a transmission-line estimating period using a pilot symbol or the like.

In this case, it is assumed that three transmission antennas are selected by the select branching unit 69-$l$. The selected transmission antennas are set to 65-$(l-1)$K+$i$, 65-$(l-1)$K+$j$, and 65-$(l-1)$K+$k$ ($1 \le i, j, k \le K$, $i \ne j$, $j \ne k$, and $k \ne i$). The select branching unit 69-$l$ branches a signal into the signal lines 171-$(l-1)$K+$i$, 171-$(l-1)$K+$j$, and 171-$(l-1)$K+$k$. Each of the delay units 181-$(l-1)$K+$i$, 181-$(l-1)$K+$j$, and 181-$(l-1)$K+$k$ applies a delay to an input signal. Although a delay amount applied here is determined by any one of methods according to the first to seventh embodiments, it can be configured such that the delay is not applied to one of the selected antennas while relative delay amounts are set to the other antennas, to suppress the total delay amount to the minimum amount.

In the receiving device, P reception signal series are input to the demodulating unit 75. To make it simple, the p-th ($1 \le p \le P$) signal series is explained. In the following explanations, it is common to all of P reception blocks with P independent operations. The select combining unit 79-$p$ ($1 \le p \le P$) selects antennas among the reception antennas 71-$(p-1)$Q+1 to 71-$p$Q, combines reception signals from signal lines corresponding to the selected antennas, and outputs a combined reception signal to the demodulating unit 75. A reference for selecting the antenna is same as the selecting reference used in the select branching unit 69-$l$ ($1 l \le L$).

In this case, it is assumed that two transmission antennas are selected by the select combining unit 79-$p$. The selected reception antennas are set to 71-$(p-1)$Q+$l$ and 71-$(p-1)$Q+$m$ ($1 \leq l$, $m \leq Q$, and $l \neq m$). The signal lines 172-(p−1)Q+l and 172-(p−1)Q+m are connected to the select combining unit 79-p. The delay units 182-(p−1)Q+l and 182-(p−1)Q+m apply a delay to signals input from the gain applying units 72-(p−1)Q+l and 72-(p−1)Q+m, respectively. Although a delay amount applied here is determined by any one of methods according to the first to seventh embodiments, it can be configured such that the delay is not applied to one of the selected antennas while relative delay amounts are set to the other antennas, to suppress the total delay amount to the minimum amount. The select combining unit 79-p combines reception signals from the delay units 182-(p−1)Q+l and 182-(p−1)Q+m.

As explained above, in the present embodiment, the same process as that of the ninth embodiment is performed for each of the transmission blocks of the transmission device and reception blocks of the receiving device. With this configuration, even in a case of the MIMO space division multiplex transmission, effects identical to those of the ninth embodiment can be obtained. Furthermore, because the reference for selecting the antenna described in the present embodiment reduces the spatial correlation between the transmission and reception branches or increases a transmission line capacity, it is possible to enhance reception separation capability of a space division multiplexed signal at the time of the space division multiplexing transmission.

Settings of the device configuration and the delay amount explained in the first to tenth embodiments can be combined as appropriate.

INDUSTRIAL APPLICABILITY

As described above, the wireless communication system according to the present invention is useful for communications using a plurality of antennas, and the wireless communication system is particularly suitable when a signal is transmitted and received by a plurality of antennas.

REFERENCE SIGNS LIST 11 modulating unit
12-1, . . . , 12-M signal line
13-2, . . . , 13-M delay unit
14-1, . . . , 14-M gain applying unit
15-1, . . . , 15-M transmission antenna
17 transmission-antenna selecting unit
18-1, . . . , 18-M signal line
19 select branching unit
21-1, . . . , 21-N reception antenna
22-1, . . . , 22-N gain applying unit
23-2, . . . , 23-N delay unit
24 combining unit
25 demodulating unit
27 reception-antenna selecting unit
29 select combining unit
31-1, . . . , 31-M modulating unit
41-2, . . . , 41-M delay unit
51-2, . . . , 51-N delay unit
61 modulating unit
62-1, . . . , 62-LK signal line
63-2, . . . , 63-K, . . . , 63-(L−1)K+2, . . . , 63-LK delay unit
64-1, . . . , 64-LK gain applying unit
65-1, . . . , 65-LK transmission antenna
69-1, . . . , 69-L select branching unit
71-1, . . . , 71-PQ reception antenna
72-1, . . . , 72-PQ gain applying unit
73-2, . . . , 73-Q, . . . , 73-(P−1)Q+2, . . . , 73-PQ delay unit
74-1, . . . , 74-P combining unit
75 demodulating unit
79-1, . . . , 79-P select combining unit
81-2, . . . , 81-M delay unit
91-2, . . . , 91-N delay unit
101 delay-amount control unit
102-2, . . . , 102-M delay unit
111 delay-amount control unit
112-2, . . . , 112-N delay unit
121 delay-amount control unit
122-2, . . . , 122-M delay unit
131 delay-amount control unit
132-2, . . . , 132-N delay unit
141-2, . . . , 141-M delay unit
142-2, . . . , 142-N delay unit
151-1, . . . , 151-M signal line
152-1, . . . , 152-N signal line
161-1, . . . , 161-M delay unit
162-1, . . . , 162-N delay unit
171-1, . . . , 171-LK signal line
172-1, . . . , 172-PQ signal line
181-1, . . . , 181-LK delay unit
182-1, . . . , 182-PQ delay unit

The invention claimed is:

1. A transmission device that includes a plurality of transmission antennas and constitutes a wireless communication system with a receiving device that includes a plurality of reception antennas, the transmission device comprising:
a signal generating unit that outputs a plurality of series of signals, where a number of the series of signals is smaller than number of the transmission antennas; and
a plurality of transmission blocks including at least two transmission antennas corresponding to each of the series of signals output from the signal generating unit, wherein
each of the transmission blocks includes:
a branching unit that branches a series of signals corresponding to the block into a plurality of transmission signals passing through a plurality of signal lines corresponding to transmission antennas included in the block, and
a transmission delay unit that is provided on at least one of the signal lines and applies a delay to a transmission signal, and
when a transmission signal branched by the branching unit is applied with a delay by the transmission delay unit, the transmission device takes the transmission signal on which the delay is applied as the transmission signal, and transmits the transmission signals to the receiving device via transmission antennas included in the transmission block,
wherein the transmission delay unit determines a delay amount to be applied to the transmission signal based on a number of the plurality of reception antennas and a number of the plurality of transmission antennas, and
wherein the transmission delay unit determines the delay amount to be applied to the transmission signal based upon $1/((MN-1)(\Delta F))$, wherein M is the number of the plurality of transmission antennas, N is the number of the plurality of reception antennas, and $\Delta F$ is a bandwidth of the transmission signal.

2. The transmission device according to claim 1, wherein when the transmission delay unit is provided in plural in each of the transmission blocks, delay amounts applied to the transmission signals by at least two of the transmission delay units are different from each other.

3. The transmission device according to claim 1, wherein the branching unit of each of the transmission blocks selects transmission antennas to be used for transmitting the transmission signals among the transmission antennas included in the transmission block, and branches the transmission signal into signal lines corresponding to selected transmission antennas.

4. The transmission device according to claim 1, wherein the transmission delay unit determines the delay amount to be applied to the transmission signal based on a transmission delay amount between the transmission device and the receiving device.

5. The transmission device according to claim 1, wherein the transmission delay unit determines the delay amount to be applied to the transmission signal based on a transmission delay amount between the transmission device and the receiving device and a reception power at the receiving device.

6. The transmission device according to claim 1, wherein the transmission delay unit determines the delay amount to be applied to the transmission signal based upon (MN−1)(ΔF).

7. A receiving device that includes a plurality of reception antennas and constitutes a wireless communication system with a transmission device that includes a plurality of transmission antennas, the receiving device comprising:
- a reception delay unit that is provided on at least one of signal lines through which reception signals received at the reception antennas pass and applies a delay to a reception signal; and
- a combining unit that takes, when the reception signal is applied with a delay by the reception delay unit, the reception signal on which the delay is applied as the reception signal, and combines the reception signals including the reception signal,
- wherein the reception delay unit determines a delay amount to be applied to the reception signal determined based upon a number of the plurality of reception antennas and a number of the plurality of transmission antennas, and
- wherein the reception delay unit determines the delay amount to be applied to the reception signal based upon 1/((MN−1)(ΔF)), wherein M is the number of the plurality of transmission antennas, N is the number of the plurality of reception antennas, and ΔF is a bandwidth of the reception signal.

8. The receiving device according to claim 7, wherein when the reception delay unit is provided in plural, delay amounts applied to the reception signals by at least two of the reception delay units are different from each other.

9. The receiving device according to claim 7, wherein
- a part of the reception antennas are select-target reception antennas that receive the reception signals when selected, and
- the receiving device comprises a reception-antenna selecting unit that selects reception antennas to be used for receiving the reception signals among the select-target reception antennas, and outputs the reception signals received at selected reception antennas to the combining unit.

10. The receiving device according to claim 7, wherein the combining unit selects reception antennas to be used for receiving the reception signals among the reception antennas, and combines reception signals received at selected reception antennas.

11. A receiving device that includes a plurality of reception antennas and constitutes a wireless communication system with a transmission device that includes a plurality of transmission antennas, wherein
- the receiving device is constituted by a plurality of reception blocks each including at least one reception antenna, including a demodulating unit that includes input terminals respectively corresponding to the reception blocks, and demodulates reception signals input from the input terminals, and
- each of the reception blocks includes:
  - a reception delay unit that is provided on at least one of signal lines through which reception signals received at reception antennas included in the reception block pass and applies a delay to a reception signal, and
  - a combining unit that takes, when the reception signal is applied with a delay by the reception delay unit, the reception signal on which the delay is applied as the reception signal, and outputs a signal obtained by combining the reception signals including the reception signal on which the delay is applied to the demodulating unit,
- wherein the reception delay unit determines a delay amount to be applied to the reception signal determined based on a number of the plurality of reception antennas and a number of the plurality of transmission antennas, and
- wherein the reception delay unit determines the delay amount to be applied to the reception signal based upon 1/((MN−1)(ΔF)), wherein M is the number of the plurality of transmission antennas, N is the number of the plurality of reception antennas, and ΔF is a bandwidth of the reception signal.

12. The receiving device according to claim 11, wherein when the reception delay unit is provided in plural in each of the reception blocks, delay amounts applied to the reception signals by at least two of the reception delay units are different from each other.

13. The receiving device according to claim 11, wherein the combining unit of each of the reception blocks selects reception antennas to be used for receiving the reception signals among the reception antennas included in the reception block, and combines reception signals corresponding to selected reception antennas.

14. The receiving device according to claim 11, wherein the reception delay unit determines the delay amount to be applied to the reception signal determined based on a transmission delay amount between the transmission device and the receiving device.

15. The receiving device according to claim 11, wherein the reception delay unit determines the delay amount to be applied to the reception signal determined based on a transmission delay amount between the transmission device and the receiving device and a reception power at the receiving device.

16. The receiving device according to claim 11, wherein the reception delay unit determines the delay amount to be applied to the reception signal based upon (MN−1)(ΔF).

* * * * *